US011353948B2

(12) United States Patent
Thomas

(10) Patent No.: US 11,353,948 B2
(45) Date of Patent: Jun. 7, 2022

(54) SYSTEMS AND METHODS FOR ADAPTIVE USER INTERFACE DYNAMICS BASED ON PROXIMITY PROFILING

(71) Applicant: Marcus Allen Thomas, Atlanta, GA (US)

(72) Inventor: Marcus Allen Thomas, Atlanta, GA (US)

(73) Assignee: Q Technologies, Inc., Brookhaven, GA (US)

( * ) Notice: Subject to any disclaimer, the term of this patent is extended or adjusted under 35 U.S.C. 154(b) by 0 days.

(21) Appl. No.: 15/654,629

(22) Filed: Jul. 19, 2017

(65) Prior Publication Data
US 2018/0150129 A1 May 31, 2018

Related U.S. Application Data
(60) Provisional application No. 62/427,828, filed on Nov. 30, 2016.

(51) Int. Cl.
G06F 3/01 (2006.01)
H04L 67/104 (2022.01)
H04L 67/75 (2022.01)
H04L 67/00 (2022.01)
H04L 67/1095 (2022.01)
G06F 9/451 (2018.01)
H04W 4/021 (2018.01)
H04W 4/80 (2018.01)

(52) U.S. Cl.
CPC ............... G06F 3/01 (2013.01); G06F 3/011 (2013.01); G06F 9/451 (2018.02); H04L 67/104 (2013.01); H04L 67/1095 (2013.01); H04L 67/34 (2013.01); H04L 67/36 (2013.01); H04W 4/021 (2013.01); H04W 4/80 (2018.02)

(58) Field of Classification Search
CPC ......... G06F 3/01; H04L 67/104; H04L 67/36; H04L 67/34; H04L 67/1095
See application file for complete search history.

(56) References Cited

U.S. PATENT DOCUMENTS 9,007,229 B1* 4/2015 Wakim ................... G08B 13/12
340/669
2008/0320078 A1* 12/2008 Feldman ................ G06Q 30/02
709/203
2012/0246007 A1* 9/2012 Williams ............... G06Q 30/02
705/14.66

(Continued)

Primary Examiner — Jeanette J Parker

(57) ABSTRACT

A method for the adaptation of a user interface based on the proximity of a plurality of computing devices connected to a network. The method includes determining, at a first client or a server, a proximity of a second client being within a predetermined range of the first client. The first client or the server determines the proximity of a second client being within a predetermined range by receiving a notification from the server, receiving a unique identifier from the second client, sensors of the first or the second client, or by determining that the location of the first client is within a predefined distance from the location of the second client. The method includes receiving, by the first client or the server, recommendations data associated with client data of the second client. The method includes adapting a user interface of the first client based on the recommendation data.

12 Claims, 10 Drawing Sheets

(56) References Cited

U.S. PATENT DOCUMENTS

| | | | |
|---|---|---|---|
| 2012/0297466 A1* | 11/2012 | Li | G06F 21/10 |
| | | | 726/7 |
| 2013/0151593 A1* | 6/2013 | Shin | H04L 67/42 |
| | | | 709/203 |
| 2014/0003195 A1* | 1/2014 | Vonog | H04B 7/26 |
| | | | 367/129 |
| 2017/0060385 A1* | 3/2017 | Goldsmith | G06F 3/0486 |
| 2017/0109806 A1* | 4/2017 | Adoni | G06Q 30/0631 |
| 2017/0289596 A1* | 10/2017 | Krasadakis | H04W 4/029 |
| 2017/0374210 A1* | 12/2017 | Channa | H04N 1/4413 |

* cited by examiner

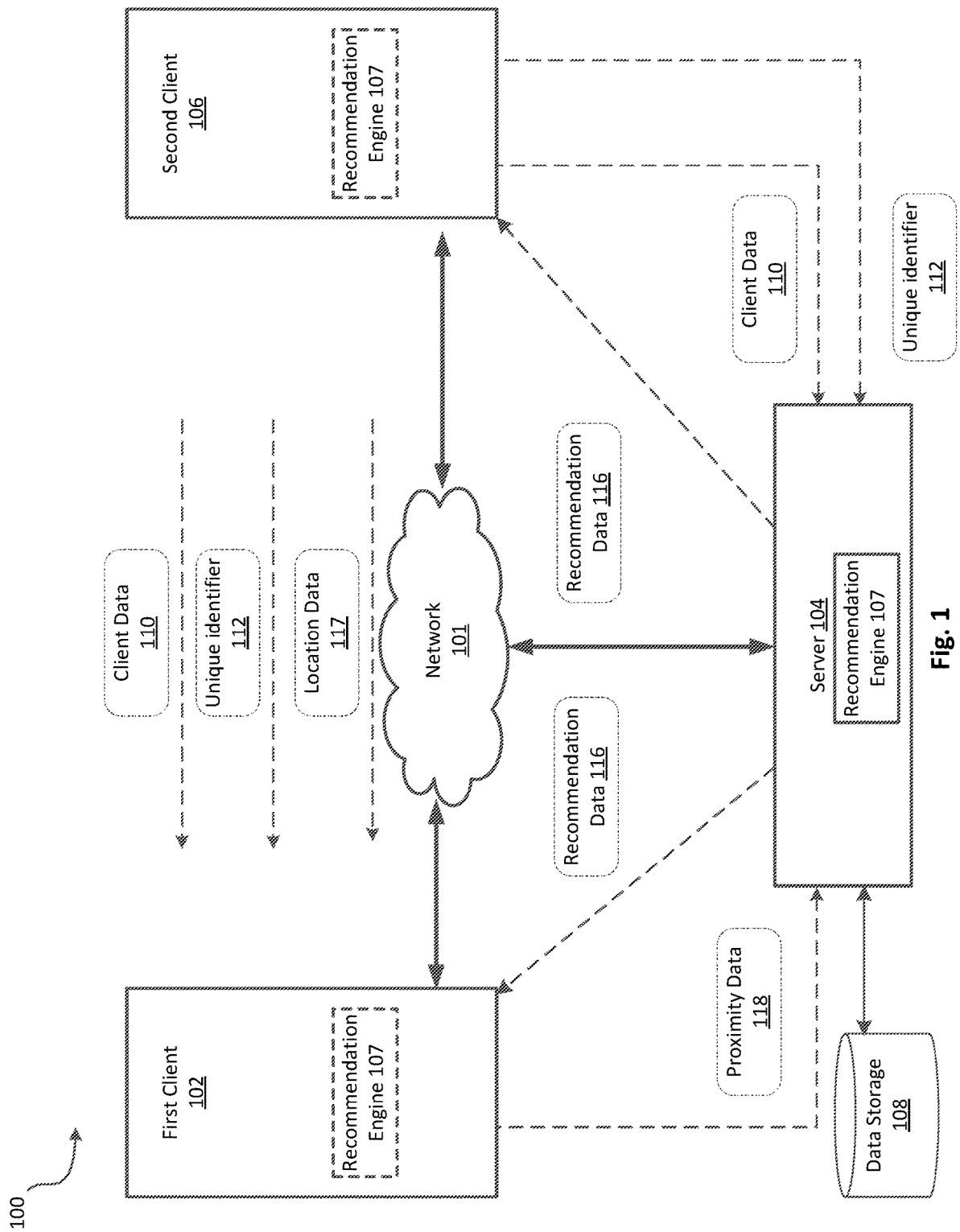

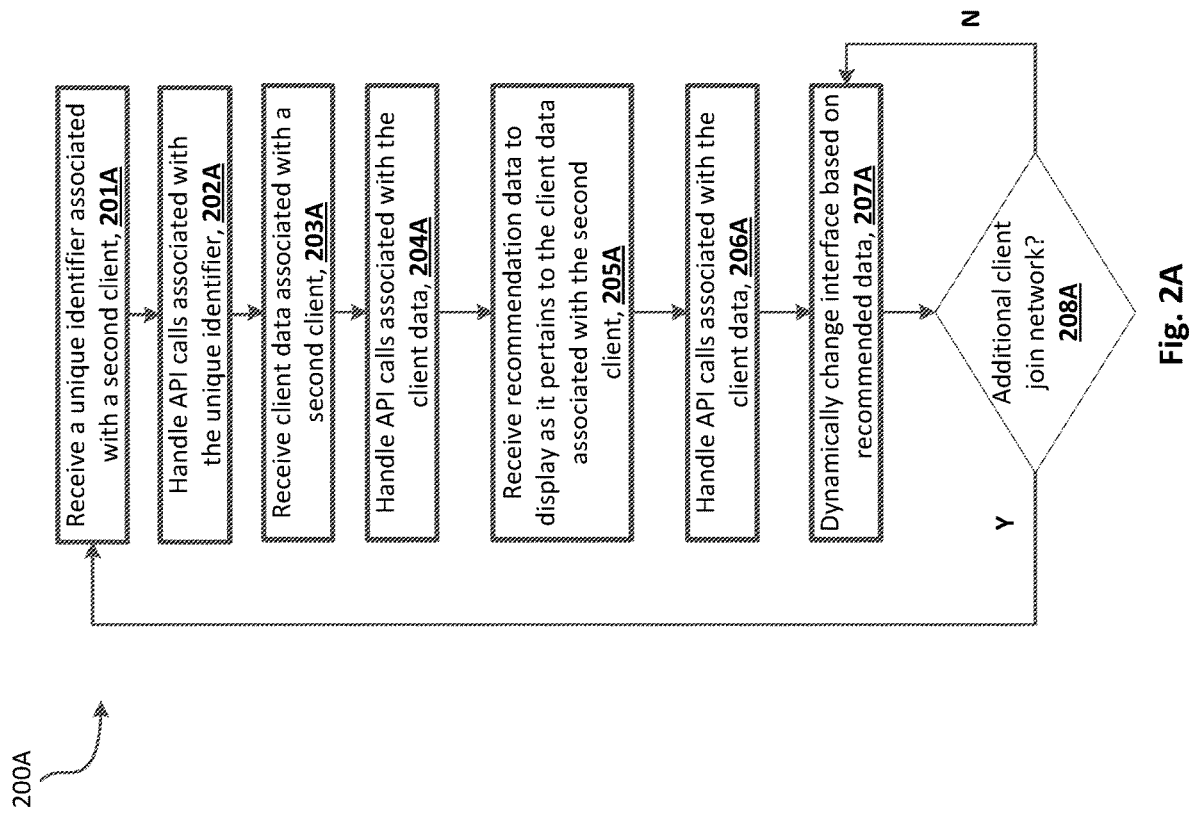

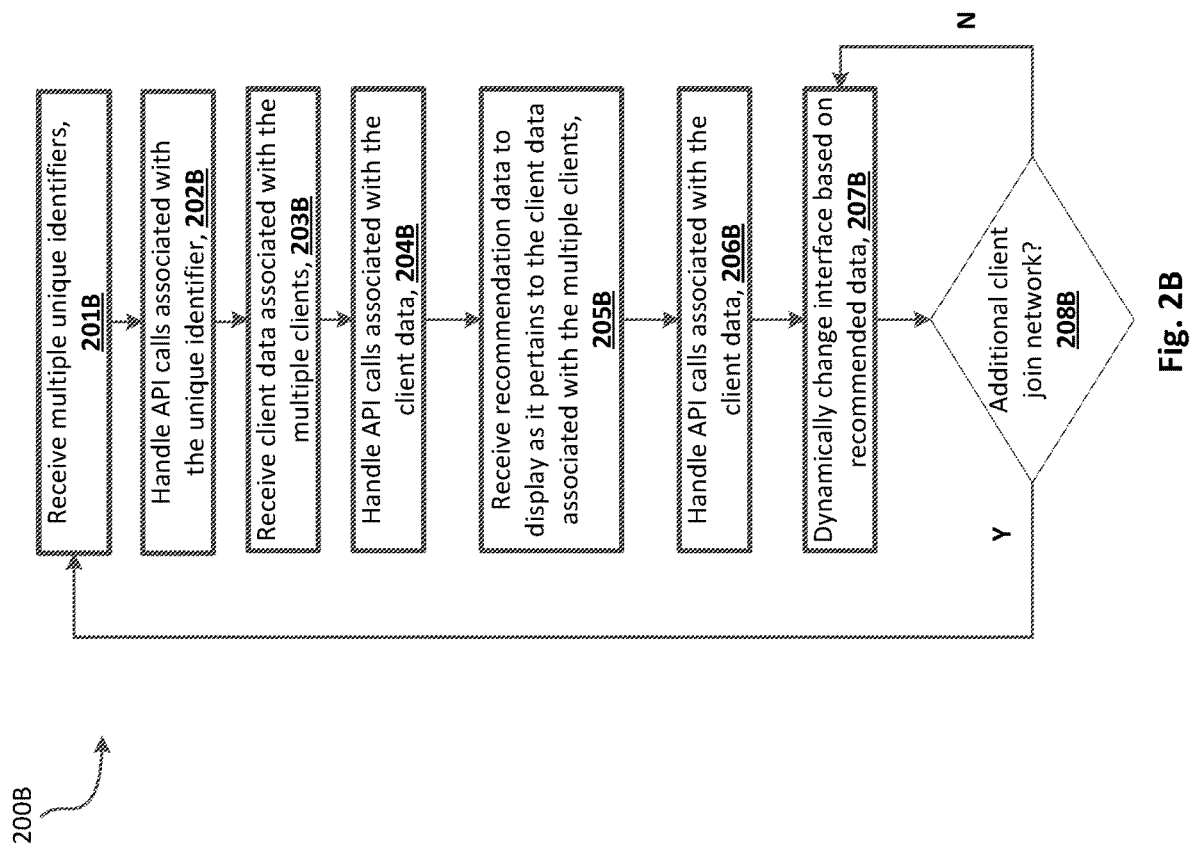

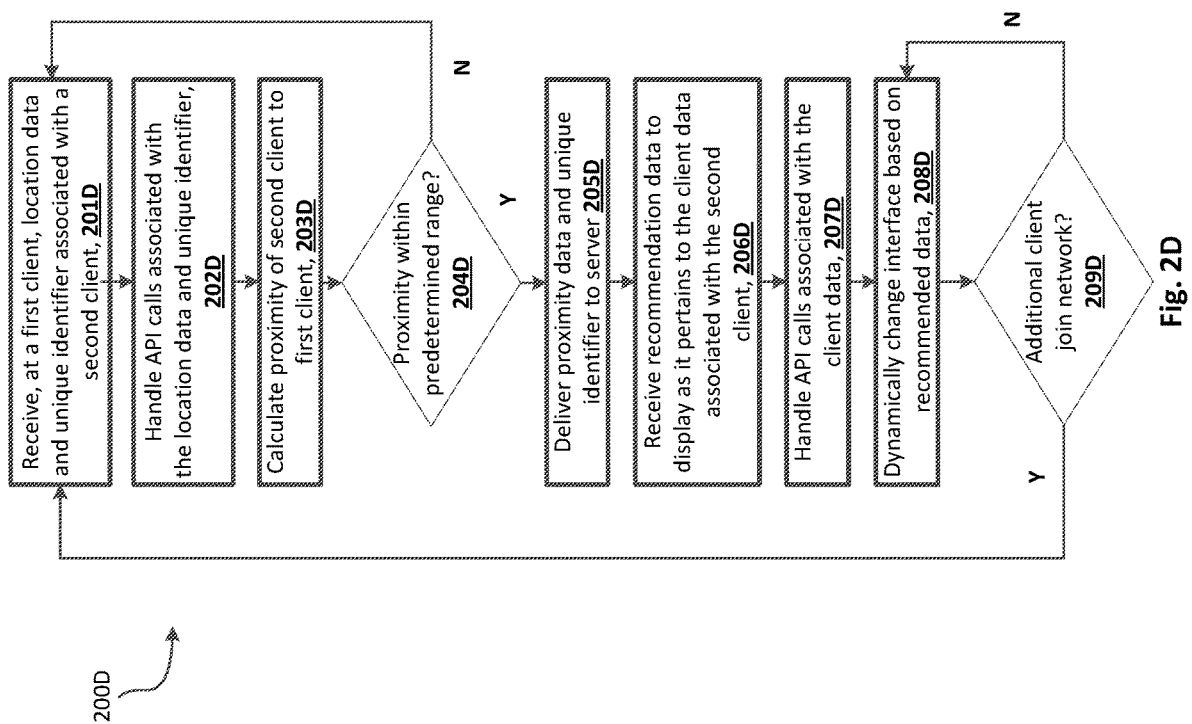

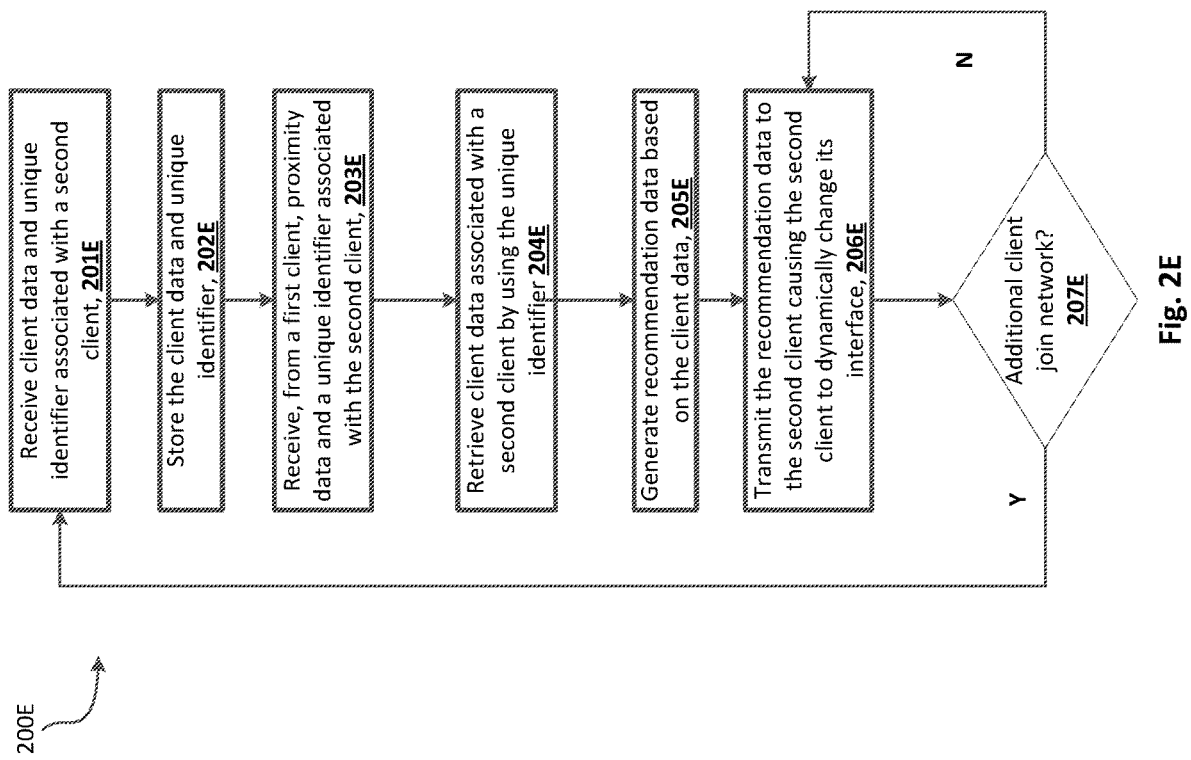

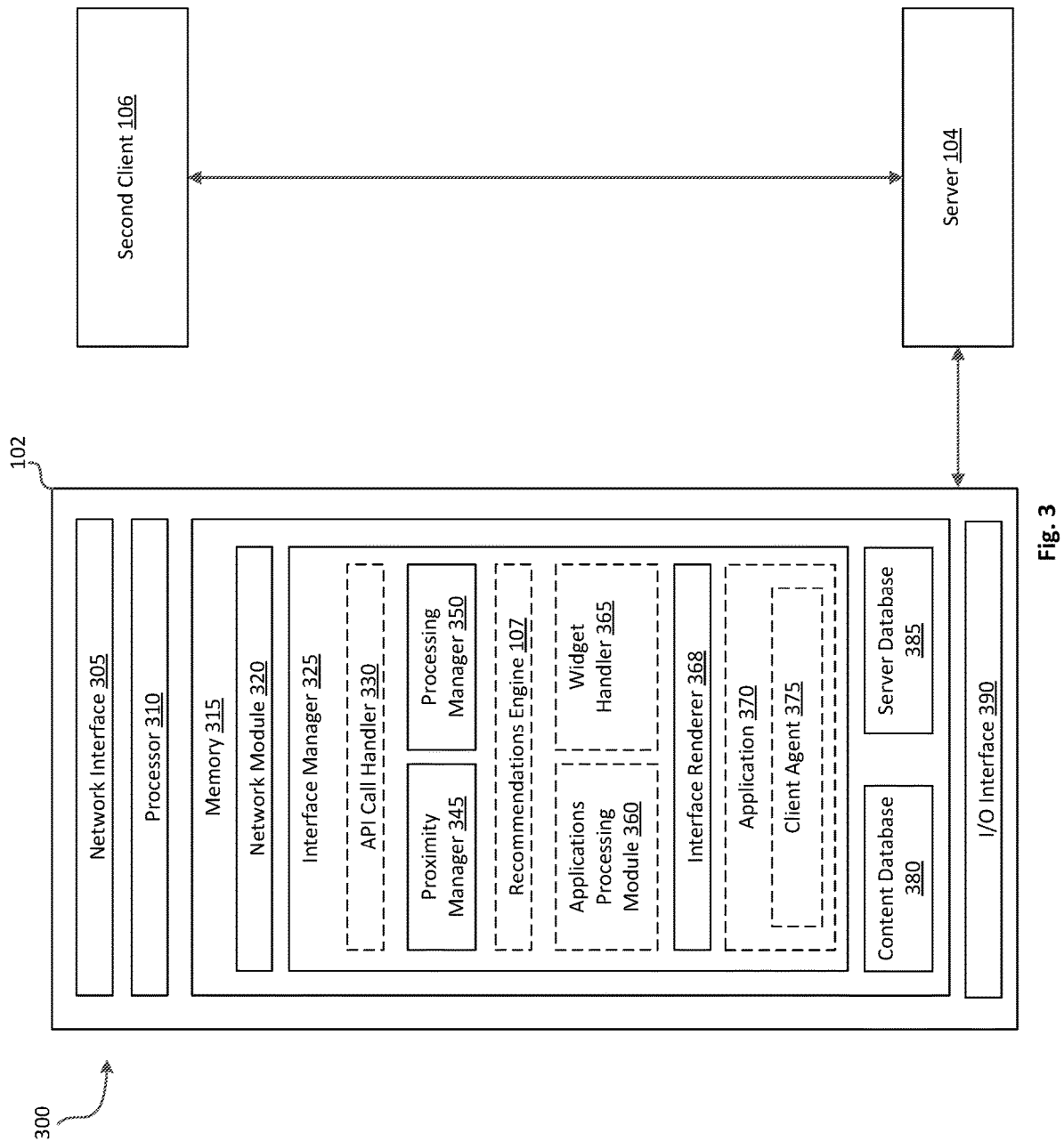

SYSTEMS AND METHODS FOR ADAPTIVE USER INTERFACE DYNAMICS BASED ON PROXIMITY PROFILING

PRIORITY REFERENCE TO RELATED APPLICATIONS

This application claims priority to U.S. Provisional Patent Application No. 62/427,828 entitled "Systems and Methods for Location-based Multi-device Interface Adaptation," filed Nov. 30, 2016, which is incorporated herein by reference in its entirety for all purposes.

BACKGROUND OF THE INVENTION

Electronic computing devices are a key part of the everyday lives of many users. Electronic devices include any number and/or type of user-operable electronic device such as a desktop computer, laptop, convertible PC, smartphone, wearable device, smart watch, tablet, phablet, personal digital assistant, set top box, smart television, gaming console device, mobile communication device, remote workstation, client terminal, entertainment console, or any other device configured to communicate with other computing devices. Users interact with such electronic devices via a user interface.

SUMMARY OF THE INVENTION

Aspects of the present disclosure relate generally to computer user interfaces, and more particularly to adaptive user interfaces (AUI).

One implementation disclosed herein is a method for the adaptation of a user interface based on the proximity of a plurality of computing devices connected to a network. The method includes determining, at a first client or a server, a proximity of a second client being within a predetermined range of the first client. In some implementations, the first client or the server determines the proximity of a second client being within a predetermined range by receiving a notification from the server, receiving a unique identifier from the second client, sensors of the first or the second client, or by determining that the location of the first client is within a predefined distance from the location of the second client. In some implementations, the method includes receiving, by the first client or the server, recommendations data associated with client data of the second client. In some implementations, the method includes adapting, by the first client and in response to receiving the recommendation data, a user interface of the first client based on the recommendation data.

In some implementations, the method includes determining, at a first client, a proximity of a plurality of second clients being within a predetermined range of the first client. In some implementations, the recommendations data received is associated with a plurality of the second clients. In some implementations, the recommendations data received by the first client is generated using sensory data in conjunction with data from the second client. In some implementations, the interface of the first client is further adapted based on a change in data on the server, the first client, or the second client due to the proximity of the second client or a third client being within a predefined distance from the first client or due to a change in sensory data of the first client, the second client, or the third client.

In some implementations, the interface is displayed on an additional (second) screen or display. In some implementations, the second screen is further personalized according to the client data of the second device. In some implementations, the method includes mirroring, from the first client, onto a second screen of the first client or the second client, a subset of the interface of the first client. In some implementations, the method includes, upon a change of the interface of the second screen, adapting the interface of a first screen. In some implementations, contents of the server or a client database are modified according to recommendations data. In some implementations, the method includes transmitting, to the server, a request causing the server to send the recommendations data to the second client.

In another aspect, the present disclosure is directed to a system for adaptation of a user interface based on the proximity of a plurality of computing devices connected to a network. The system includes memory storing instructions and processor executing instructions to determine, at a first client or a server, a proximity of a second client being within a predetermined range of the first client. In some implementations, the first client or the server determines the proximity of the second client being within a predetermined range of the first client by: receiving a notification from the server, receiving a unique identifier from the second client, sensory data, or by determining that a location of the first client is within a predefined distance from a location of the second client. In some implementations, the system includes memory storing instructions and processor executing instructions to receive, by the first client or the server, recommendations data associated with client data of the second client. In some implementations, the system includes memory storing instructions and processor executing instructions to adapt, by the first client and in response to receiving the recommendation data, a user interface of the first client based on the recommendation data.

In some implementations, the system includes memory storing instructions and processor executing instructions to determine, at a first client, a proximity of a plurality of second clients being within a predetermined range of the first client. In some implementations, the recommendations data received is associated with the plurality of second clients. In some implementations, the recommendations data received by the first client is generated using the sensory data in conjunction with data from the second client. In some implementations, the user interface of the first client is further adapted based on a change in data on the server, the first client, or the second client due to the proximity of the second client or a third client being within a predefined distance from the first client or due to a change in sensory data of the first client, the second client, or the third client.

In some implementations, the user interface is displayed on an additional (second) screen or display. In some implementations, the second screen is personalized according to the client data of the second device. In some implementations, the system includes memory storing instructions and processor executing instructions to mirror, from the first client, onto a second screen of the first or second client, a subset of the interface of the first client. In some implementations, the system includes memory storing instructions and processor executing instructions to, upon a change of the interface of the second screen, adapt the interface of the first screen. In some implementations, the contents of the server or a client database are modified according to the recommendations data. In some implementations, the system includes memory storing instructions and processor executing instructions to transmit, to the server, a request causing the server to send the recommendations data to the second client.

BRIEF DESCRIPTION OF THE DRAWINGS

Those skilled in the art will appreciate that the summary is illustrative only and is not intended to be in any way limiting. The details of one or more implementations are set forth in the accompanying drawings and the description below. Other features, aspects, and advantages of the disclosure will become apparent from the description, the drawings, and the claims, in which:

FIG. 1 is a block diagram of an example environment 100 for receiving data associated with a client device at a location and displaying dynamic information based on a recommendation engine, according to a described implementation;

FIG. 2A is a flow diagram of the operations taken by a server 104 and two client devices in an example process 200A for receiving data associated with a client device at a location and displaying dynamic information based on a recommendation engine, according to a described implementation;

FIG. 2B is a flow diagram of the operations taken by a server 104 and two client devices in an example process 200B for receiving data associated with a client device at a location and displaying dynamic information based on a recommendation engine, according to a described implementation;

FIG. 2D is a flow diagram of the operations taken by a server 104 and two client devices in an example process 200D for receiving data associated with a client device at a location and displaying dynamic information based on a recommendation engine, according to a described implementation.

FIG. 2E is a flow diagram of the operations taken by a server 104 in an example process 200D for receiving data associated with a client device at a location and displaying dynamic information based on a recommendation engine, according to a described implementation.

FIG. 3 is a block diagram of an example environment 300 receiving data associated with a client device at a location and displaying dynamic information based on a recommendation engine, according to a described implementation;

Like reference numbers and designations in the various drawings indicate like elements.

DETAILED DESCRIPTION

Figure 2C:
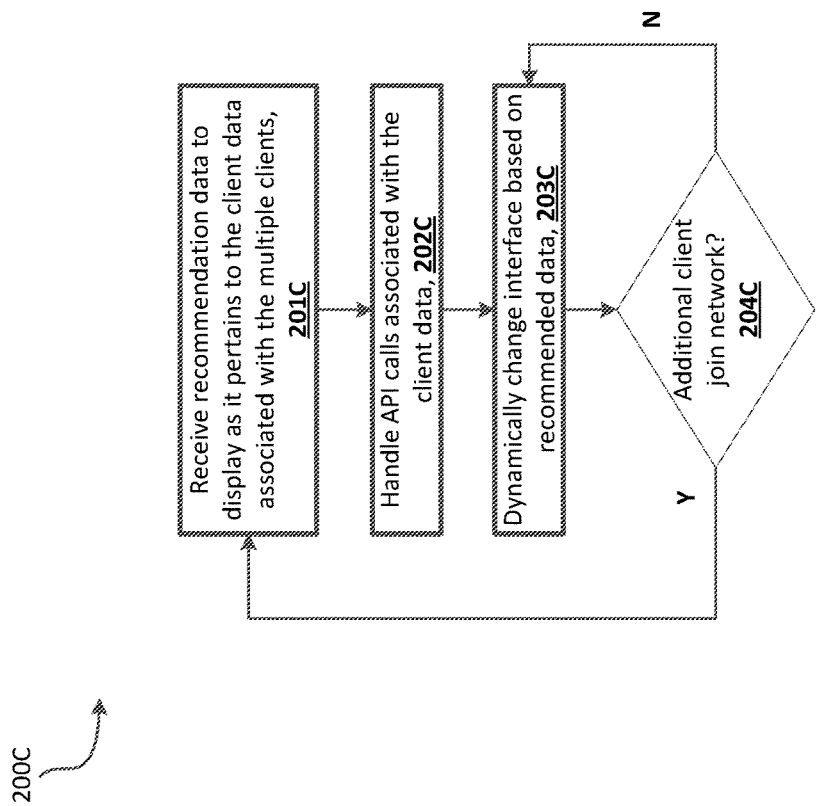
FIG. 2C is a flow diagram of the operations taken by a server 104 and two client devices in an example process 200C for receiving data associated with a client device at a location and displaying dynamic information based on a recommendation engine, according to a described implementation.

Adaptive user interfaces (AUI) allow for personalization towards application users for their benefit through ease of use. Small screen interfaces are increasingly difficult to design since the lack of screen real-estate could force designers to compromise on either form, simplicity, or functionality. Creating interfaces that personally adapt to the needs of the user enables screen designers to confer precious real-estate to the specific needs of the viewing party.

One approach to adapting an interface of a computing device to the user's specific needs involves adapting the interface based on geo-locational data. For example, a geo-locational system may use a Global Positioning System (GPS) to record the location of a mobile device and associate the mobile device's location with stationary points of interest, such as a location of a movie theatre or a museum. However, with the advent of The Internet of Things (IoT), hyper-localized content distribution and its benefits stem new use cases that instead rely on the communication between devices within the same proximity, rather than geo-locational mapping.

Accordingly, the present disclosure is directed to systems and methods for receiving data associated with nearby client devices and displaying dynamic information generated by a recommendation engine based on the received data.

The various concepts introduced above and discussed in greater detail below may be implemented in any of numerous ways, as the described concepts are not limited to any particular manner of implementation. Examples of specific implementations and applications are provided primarily for illustrative purposes.

FIG. 1 is a block diagram of an example environment 100 for receiving data associated with a client device at a location and displaying dynamic information based on a recommendation engine, according to a described implementation. In general, the system and method discussed herein includes a first client that may detect the presence of a second client within its proximity and generate proximity information. For example, the first client receives a unique identifier (e.g., device identifier) associated with a second client and location data indicating the location of the second client. The first client calculates the proximity of the second client based on the second client's location data and if the proximity is within a predetermined range, first client notifies a server by sending proximity data and the unique identifier of the second client to the server. The second client also sends its client data (e.g., browser search history, social network information) and its unique identifier to the server. In response to receiving the proximity data from first client, a recommendation engine of the server generates recommendation data based on the proximity data received from the first client and the client data received from the second client, and delivers the recommendation data to the first client and/or the second client causing the receiving client's interface dynamics to change based on the recommendation data. In some implementations, in response to receiving proximity data from a second client, a recommendation engine of the server may generate recommendation data based on the proximity data received from the second client and the client data received from first client, and deliver the recommendation data to the first client and/or the second client. In some implementations, the second client may also send its client data directly to the first client. In this instance, the first client may use its own recommendation engine to generate recommendation data based on client data of the second client. In some implementations, the server may send a notification message to the first client to notify the first client that a second client is within the proximity of the first client. The notification message may trigger the first client to generate recommendation data using its internal recommendation engine and based on client data associated with the second client.

In greater detail, environment 100A includes a first client 102 for generating proximity data (e.g., proximity data 118) when a second client 106 enters within a predetermined range (based on distance, radio frequency power (RF), or time delay, as described herein) from first client 102. The environment 100A also includes a server 104 comprising a recommendations engine 107 for identifying content to recommend (e.g., recommendation data 116) to second client 106 based on client data (e.g., client data 110) associated with second client 106 or a unique identifier (e.g., unique identifier 112) associated with second client 106, and then delivering the recommendation data 116 to first client 102 and/or second client 106 for display. The environment 100A also includes a data storage (e.g., data storage 108) allowing server 104 to store copies of client data 110, unique identifier 112, recommendation data 116, and/or proximity data 118 that server 104 receives from any client device. Each computing device (e.g., first client 102, server 104, and second client 106) may communicate via network 101 or via any device-to-device direct connection (e.g., wired or unwired). Although not illustrated in FIG. 1, environment 100 may include a second screen (e.g., second screen 501 as shown in FIG. 5) and/or a remote device (e.g., remote device 503 as shown in FIG. 5). Each client, server, optional second screen, and optional remote device may be connected to the network 101 via a network interface (e.g., network interface 305). The environment 100A may include a plurality of clients, servers, and data storages. In some implementations, any of server 104, first client 102, and second client 106 may include a recommendations engine 107. In some implementations, second screen 501 may be the second interface of a client device (e.g., first client 102 or second client 106).

Network 101 may be a local area network (LAN), wide area network (WAN), a telephone network (e.g., Public Switched Telephone Network (PSTN)), a wireless link, a cellular communication system, an intranet, the Internet, or combinations thereof. Types of cellular radiotelephone communication systems intended to be within the scope of the present disclosure include, but are not limited to, Frequency Division Multiple Access (FDMA) systems, Time Division Multiple Access (TDMA) systems, Extended-TDMA (E-TDMA) cellular radiotelephone systems, Global System for Mobile Communications (GSM) systems, Code Division Multiple Access (CDMA) systems (particularly, Evolution-Data Optimized (EVDO) systems), CDMA-2000 systems, Universal Mobile Telecommunications Systems (UMTS) (particularly, Wideband Code Division Multiple Access (WCDMA), Long Term Evolution (LTE) systems, Single Radio LTE (SRLTE) systems, Simultaneous GSM and LTE (SGLTE) systems, High-Speed Downlink Packet Access (HSDPA) systems, and the like), Code Division Multiple Access 1× Radio Transmission Technology (1×) systems, General Packet Radio Service (GPRS) systems, Wi-Fi systems, Bluetooth systems, Near-Field Communication systems, Personal Communications Service (PCS) systems, and other protocols that may be used in a wireless communications network or a data communications network. The network 101 may connect one or more devices via an Open Systems Interconnection (OSI) model. In some implementation, the network 101 may use an internet protocol suite, including the Transmission Control Protocol (TCP) and the Internet Protocol (IP). Although not illustrated, in many implementations, network 101 may comprise one or more intermediary devices, including gateways, routers, firewalls, switches, network accelerators, Wi-Fi access points or hotspots, or other devices.

First client 102 may be any type of electronic computing device. For example, first client 102 may include any number and/or type of user-operable electronic device such as a desktop computer, laptop, convertible PC, smartphone, wearable device, smart watch, tablet, phablet, personal digital assistant, set top box, smart television, gaming console device, mobile communication device, remote workstation, client terminal, entertainment console, or any other device configured to communicate with other computing devices (e.g., second client 106), systems, and server (e.g., server 104) via the network 101. First client 102 may include an edge connected device or host connected device such as a beacon device, a near field communication (NFC) chip, radio-frequency identification (RFID) sensor, connected light bulb, smart thermostat or any other connected hardware device or apparatus or apparatus that communicates with a connected device. First client 102 may be a computing device that is similar to second client 106 and may perform all or a portion of the functionality supported by second client 106, as described herein. In some implementations, environment 100A may include a plurality of computing devices that are similar to first client 102 and may perform all or a portion of the functionality supported by first client 102, as described herein.

Client data 110 is a unique set of data associated with a computing device, such as first client 102, second client 106, or server 104. Client data 110 may be one or more of user information (e.g., search keywords, search history data, cookie information, bookmarks, phone number, address, username), device sensor data (e.g., temperature, humidity, barometric pressure, light, pedometer data, sound, infrared, motion, speed, ultrasonic data, accelerometer data, gyroscope data, vibration, orientation, force sensing resistor data, touchscreen data, environmental sensor data), device identifier information (e.g., a media access control address (MAC) address, device ID, Universal Device Identification (UDID), Identifier For Vendor (IDFV), Identifier for Advertiser (IDFA), operating system version, operating system build version, charging state, discharging state, idle state, active state, power-down state, sleep state), advertisements, text message data, email data, financial data, social data, profile data, user preferences, user interests, advertisement preferences, calendar events (e.g., birthdays, holidays, meetings, alarms set, deadlines), document (e.g., ascii, doc, docbook, hypertext markup language (html), xml, pdf, postscript (ps), rich text format (RTF), android package kit (apk)), picture (e.g., jpeg, tiff, gif, bmp, png, thumbnails), video (e.g., 3g2, 3gp, avi, fly, mov, mpeg-1, mpeg-2, mpeg-4, mpg), audio (e.g., way, aiff, au, mpeg-4, mp3), streaming media, rich media, application data, server data, unique identifier, non-unique identifier or profile data, game data, or any other data. In some implementations, client data 110 may be associated with more than one computing device. For example, a user may access a website using a smartphone. The website may gather information about the user's activity and store the information on the smartphone in the form of a data file, such as a cookie. When the same user accesses the same website using, for example, a desktop computer, the website may gather information that is similar to the information gathered and stored on the smartphone. In this instance, client data 110 may be associated with both the smartphone and the desktop computer.

Unique identifier 112 may be a value, object, pointer, or identifier that refers to client data 110. In some implementations, unique identifier 112 may designate the location of client data 110. For example, unique identifier 112 may be a pointer to a memory address (e.g., a ROM address, a RAM address, or an address in flash memory), the name of a data storage (e.g., data storage 108), the name of a web server (e.g., server 104), an IP address of a storage device, a media access control (MAC) address of a storage device, or any other type of identifier that refers to client data 110 or the location where client data 110 is stored. First client 102 may access the client data (e.g., client data 110) associated with second client 106 by using the unique identifier 112 associated with that client data. For example, unique identifier 112 may provide first client 102 with enough information (e.g., username, password, credentials) to access and retrieve the client data (e.g., client data 110) associated with unique identifier 112 from a remote data storage, such as data storage 108. In some implementations, unique identifier 112 may be any unique information that refers to a client device on a network, such as a device identifier or device name assigned by a network.

First client 102 may receive client data 110 associated with any other computing device, such as second client 106. In some implementations, first client 102 may receive client data 110 associated with second client 106 from either first client 102 or server 104. In some implementations, first client 102 may receive client data 110 associated with second client 106 from both first client 102 and server 104. For example, first client 102 may receive a first portion of client data 110 associated with second client 106 from server 104 and a second portion of client data 110 from second client 106. In some implementations, first client 102 may retrieve the client data 110 associated with second client 106. For example, first client 102 may execute an application (e.g., application 370) that downloads client data 110 associated with second client 106 from server 104. In some implementations, second client 106 may send its client data 110 to first client 102 without first client 102 sending a data request to second client 106. First client 102 may send a request to second client 106 to request second client's 106 data (e.g., client data 110). In some implementations, first client 102 may receive input from a user of the first client 102. In some implementations, first client 102 may be configured to request client data 110 from server 104. In some implementations, first client 102 may be configured to request client data 110 from second client 106.

First client 102 may receive a notification from server 104 indicating the availability of client data 110 associated with second client 106. For example, first client 102 may send a data request to server 104 requesting client data 110 associated with second client 106. Upon receiving the request, server 104 may determine the availability of client data 110 associated with second client 106 and send a notification message to first client 102 when client data 110 is available. In some implementations, server 104 may send client data 110 to first client 102 without sending a notification to first client 102. Server 104 may determine the availability of client data 110 by searching a storage location (e.g., data storage 108, internal cache) for data associated with second client 106. Server 104 may retrieve client data 110 from the storage location and deliver it to the requesting device (e.g., first client 102). In some implementations, server 104 may determine the availability of client data 110 by sending a data request to second client 106, the request comprising unique identifier 112. In response to receiving the data request, second client 106 may gather all data from its local storage locations (e.g., ROM and RAM) and send the gathered data to server 104. In turn, server 104 sends client data 110 to first client 102. In some implementations, server 104 gathers client data 110 from each client device (e.g., first client 102, second client 106) connected to network 101. For example, server 104 may send a first data request to first client 102 and a second data request to second client 106. In response, first client 102 sends (to server 104) client data 110 associated with first client 102 and second client 106 sends (to server 104) client data 110 associated with second client 106. Server 104 stores each set of client data 110 in data storage 108.

First client 102 may determine its proximity to second client 106 based on a location ("first location" as described herein) of first client 102 and a location (e.g., location data 117) of second client 106. In some implementations, first client 102 may determine its location (or geographic location) via a global positioning system (GPS). In some implementations, first client 102 may determine its location (or geographic location) via a connection with network 101. For example, network 101 may assign an IP address to first client 102 that first client 102 may use to determine its location. In some implementations, first client 102 may receive location data from user input. For example, a user of first client 102 may execute a web mapping application to display a map on first client 102. The user may select a location on the map and in response, the web mapping application may share the coordinates of the selected location with first client 102. In some implementations, the user may directly input coordinates into a GUI (e.g., pop-up window, an entry field) on first client 102. In some implementations, first client 102 may determine its proximity to the second client 106 based on network characteristics (e.g., network location) of first client 102 and/or second client 106. For example, the location ("first location" as described herein) of first client 102 may be defined in terms of the IP address, pin or number of hops to a specific IP address, access to a specific network, type of network, etc.

First client 102 may be configured to accept data (e.g., client data 110, unique identifier 112, recommendation data 116, and/or location data 117) from any computing device, such as second client 106, and/or any server, such as server 104. First client 102 may also receive location input from a user. First client 102 may use a location of second client 106 (e.g., location data 117) to calculate its proximity to second client 106. First client 102 may generate proximity data 118 based on its calculation of its proximity to second client 106. In some implementations, proximity data 118 comprises the unique identifier 112 of second client and location data (e.g., location data 117) of second client 106. In this instance, a computing device (e.g., first client 102, second 106, server 14) may identify the specific client device associated with proximity data by extracting its unique identifier from the proximity data. The same computing device may also identify the location of the same client device by extracting the location information from the proximity data.

First client 102 may send its data (e.g., client data 110, unique identifier 112, recommendation data 116, location data 117, and/or proximity data 118) to server 104. In some implementations, first client 102 may send its data (e.g., client data 110, unique identifier 112, recommendation data 116, location data 117, and/or proximity data 118) to second client 106 via the network 101, via network interface 305, or any another communication method. For example, first client 102 may send its data (e.g., client data 110, unique identifier 112, recommendation data 116, location data 117, and/or proximity data 118) to second client 106 via a Bluetooth signal, near field communication (NFC), radio-frequency identification (RFID), proximity sensor, or ultrasonic sound. In another instance, second client 106 may retrieve data associated with first client 102 (e.g., client data 110, unique identifier 112, recommendation data 116, location data 117, and/or proximity data 118) via its proximity to first client 102. For example, first client 102 may broadcast its data (e.g., client data 110, unique identifier 112, recommendation data 116, location data 117, and/or proximity data 118) via Bluetooth Low Energy, or a radio-frequency identification (RFID) reader.

A first location may be a location of first client 102, a location of an account associated with first client 102, or a location specified or stored on first client 102. For example, the first location may be determined by first client 102, a GPS-enabled device, based on its GPS coordinates. In another example, first client 102 may be logged in under a first account associated with first client 102. In yet another example, a user of first client 102 may specify the first location on a map presented on a display of first client 102. In yet another example, an application or a plug-in executing on first client 102 may specify the first location. In some implementations, server 104 may determine the first location of first client 102 without first client 102 sending the first location. For example, server 104 may determine a network characteristic of first client 102 (e.g., IP address) and determine the location of first client 102. In some implementations, server 104 may determine a location of first client 102 based on an account that first client 102 is logged into. For example, first client 102 may log into an account before sending its data (e.g., client data 110, unique identifier 112, recommendation data 116, location data 117, and/or proximity data 118) to another computing device (e.g., server 104, second client 106). When first client 102 updates its locally stored data (e.g., client data 110), server 104 may determine a default location from the account and associate the default location with first client 102. In some implementations, server 104 may obtain the first location of first client 102 by sending a request to first client 102. The first location may be defined in terms of geolocation, postal address, IP address, as part of a geographic hierarchy. In some implementations, the first location may refer to a previous location of first client as a result of processing delay or latency. For example, first client 102 may be 5 feet from a television at a store when it begins the process to determine its current location. By the time first client 102 determines its location as 5 feet from the television, first client 102 may have already moved an additional 50 feet away from the television (i.e., first client 102 is now 55 feet from the television.) That is, the first client's 102 processing delay caused an error of 50 feet in first client's 102 location determination. In some implementations, the processing delay is negligible such that the difference between first location and the present location of first client 102 may be 1 foot, 2 feet, 3 feet, 4 feet, 5 feet, 6 feet, 7 feet, 8 feet, 9 feet, 10 feet, or any combination therefore.

Second client 106 may be any type of electronic computing device. Second client 106 may be any type of electronic computing device. For example, second client 106 may include any number and/or type of user-operable electronic device such as a desktop computer, laptop, convertible PC, smartphone, wearable device, smart watch, tablet, phablet, personal digital assistant, set top box, smart television, gaming console device, mobile communication device, remote workstation, client terminal, entertainment console, or any other device configured to communicate with other computing devices (e.g., first client 102), systems, and server (e.g., server 104) via the network 101. Second client 106 may include an edge connected device or host connected device such as a beacon device, a near field communication (NFC) chip, radio-frequency identification (RFID) sensor, connected light bulb, smart thermostat or any other connected hardware device or apparatus or apparatus that communicates with a connected device. Second client 106 may be a computing device that is similar to first client 102 and may perform all or a portion of the functionality supported by first client 102, as described herein. In some implementations, environment 100A may include a plurality of computing devices that are similar to second client 106 and may perform all or a portion of the functionality supported by second client 106, as described herein.

Second client 106 may determine its proximity to first client 102 based on a location ("first location" as described herein) of first client 102 and a location (e.g., location data 117) of second client 106. In some implementations, second client 106 may determine its location (or geographic location) via a global positioning system (GPS). In some implementations, second client 106 may determine its location (or geographic location) via a connection with network 101. For example, network 101 may assign an IP address to second client 106 that second client 106 may use to determine its location. In some implementations, second client 106 may receive location data from user input. For example, a user of second client 106 may execute a web mapping application to display a map on second client 106. The user may select a location on the map and in response, the web mapping application may share the coordinates of the selected location with second client 106. In some implementations, the user may directly input coordinates into a GUI (e.g., pop-up window, an entry field) on second client 106. In some implementations, second client 106 may determine its proximity to the first client 102 based on network characteristics (e.g., network location) of first client 102 and/or second client 106. For example, the location of second client 106 (e.g., location data 117) may be defined in terms of the IP address, pin or number of hops to a specific IP address, access to a specific network, type of network, etc.

Second client 106 may execute an application to send data to server 104 over the network 101. For example, second client 106 may send its client data (e.g., client data 110), a unique identifier to its client data (e.g., unique identifier 112), recommendation data generated by a recommendation engine (e.g., recommendation data 116), location data indicating its present location (e.g., location data 117), and/or its proximity data indicating its proximate range to first client 102 (e.g., proximity data 118. An application may be a mobile application, a web browser, a chat program, a stand-alone application, a widget application, a plug application, or any type application. The application may be a third-party application. The application may be written in one or more computer programming languages (including scripting language or markup language) such as, but not limited to, ACTIONSCRIPT®, C, C++, C#, Cascading Style Sheets (CSS), DART®, ECMASCRIPT®, Extensible Markup Language (XML), JAVA®, JAVASCRIPT® including JACASCRIPT® Object Notation (JSON), PERL®, Hypertext Markup Language (HTML), PYTHON®, Typescript, VBScript, VISUAL BASIC®, or any other language. The application may use an application programmable interface (API) to communicate to server 104. In some implementations, the application may use an API to communicate with a second application executing on second client 106. The application may be configured to allow a user to select its data (e.g., client data 110, unique identifier 112, recommendation data 116, location data 117, and proximity data 118) to be shared with another computing device, such as first client 102 or server 104. In some instances, the application may be configured to accept a unique identifier (e.g., unique identifier 112) corresponding to client data (client data 110). The application may receive location input from the user. In some implementations, the application may use a location of second client 106. The application on the second client 106 may send data associated with second client 106 (e.g., client data 110, unique identifier 112, recommendation data 116, location data 117, proximity data 118) to server 104. In some implementations, the application on second client 106 may send data associated with first client 102 (e.g., client data 110, unique identifier 112, recommendation data 116, location data 117, proximity data 118) to server 104.

Second client 106 may send its data (e.g., client data 110, unique identifier 112, recommendation data 116, location data 117, and/or proximity data 118) to first client 102 or server 104. In some implementations, second client 106 may send its data (e.g., client data 110, unique identifier 112, recommendation data 116, location data 117, and/or proximity data 118) to first client 102 via the network 101, via a network interface, or any another communication method. For example, second client 106 may send its data (e.g., client data 110, unique identifier 112, recommendation data 116, location data 117, and/or proximity data 118) to first client 102 via a Bluetooth signal, near field communication (NFC), radio-frequency identification (RFID), proximity sensor, or ultrasonic sound. In another instance, first client 102 may retrieve data associated with second client 106 (e.g., client data 110, unique identifier 112, recommendation data 116, location data 117, and/or proximity data 118) via its proximity to second client 106. For example, second client 106 may broadcast its data (e.g., client data 110, unique identifier 112, recommendation data 116, location data 117, and/or proximity data 118) via Bluetooth Low Energy, or a radio-frequency identification (RFID) reader.

A second location (e.g., location data 117) may be a location of second client 106, a location of an account associated with second client 106, or a location specified or stored on second client 106. For example, the second location may be determined by second client 106, a GPS-enabled device, based on its GPS coordinates. In another example, second client 106 may be logged in under an account associated with second client 106. In yet another example, a user of second client 106 may specify the second location on a map presented on a display of second client 106. In yet another example, an application or a plug-in executing on second client 106 may specify the second location. In some implementations, server 104 may determine the second location of second client 106 without second client 106 sending the second location. For example, server 104 may determine a network characteristic of second client 106 (e.g., IP address) and determine the location of second client 106. In some implementations, server 104 may determine a location of second client 106 based on an account that second client 106 is logged into. For example, second client 106 may log into an account before sending its data (e.g., client data 110, unique identifier 112, recommendation data 116, location data 117, and/or proximity data 118) to another computing device (e.g., server 104, first client 102). When second client 106 updates its locally stored data (e.g., client data 110), server 104 may determine a default location from the account and associate the default location with second client 106. In some implementations, server 104 may obtain the second location of second client 106 by sending a request to second client 106. The second location may be defined in terms of geolocation, postal address, IP address, as part of a geographic hierarchy. In some implementations, the second location may refer to a previous location of second client as a result of processing delay or latency. For example, second client 106 may be 5 feet from a television at a store when it begins the process to determine its current location. By the time second client 106 determines its location as 5 feet from the television, second client 106 may have already moved an additional 50 feet away from the television (i.e., second client 106 is now 55 feet from the television.) That is, the second client's 106 processing delay caused an error of 50 feet in second client's 106 location determination. In some implementations, the processing delay is negligible such that the difference between second location and the present location of second client 106 may be 1 foot, 2 feet, 3 feet, 4 feet, 5 feet, 6 feet, 7 feet, 8 feet, 9 feet, 10 feet, or any combination therefore.

Server 104 may be any type of web-based server. Server 104 may execute one or more virtual machines. In some instances, server 104 may send data (e.g., client data 110, unique identifier 112, recommendation data 116, and/or location data 117) associated with any computing device on network 101 to any other computing device on network 101. In some implementations, server 104 may send recommendations data 116 to first client 102, second client 106, or both. In some implementations, server 104 sends the data to all computing devices on network 101 simultaneously (i.e., multicast) or one at a time (i.e., unicast).

Server 104 may retrieve a unique identifier associated with a client device (e.g., first client 102, second client 106) from a storage device (e.g., data storage 108). In some implementation, the retrieved unique identifier may be inaccessible to other computing devices, such as first client 102 and second client 106. For example, security credentials (e.g., username and password) must be entered by a computing device to access the unique identifier and the security credentials are only available to server 104. In some implementations, the contents of data storage 108 are encrypted based on an encryption key only available to server 104. Accordingly, client devices, such as first client 102 and second client 106, may not decrypt the contents of data storage 108 making the content of data storage 108 inaccessible to the computing devices.

Server 104 may act as a first or second client in any or part of the execution steps of first client 102 or second client 106. Server 104 may notify first client 102 or second client 106 of its proximity to another client. Server 104 may use a unique identifier (e.g., a device ID) of first client 102 or second client 106 to alert first client 102 or second client 106 of the proximity of another client. For instance, server 104 may receive, from first client 102, a unique identifier and proximity data (e.g., location data 117, proximity data 118) of a second client (e.g., second client 106) that is within a predetermined range of first client 102. Server 104 may notify second client 106 of its proximity to first client 102. Server 104 may use a unique identifier of second client 106 to notify second client 106. In another instance, server 104 may receive from second client 106, a unique identifier and proximity data of first client 102 in the proximity of second client 106. Server 104 may notify first client 102 of its proximity to second client 106. Server 104 may use a unique identifier of first client 102 to notify first client 102. In some implementations, environment 100A may include a plurality of servers 104. In some implementations, a predetermined range may be based on distance (e.g., less than or equal to 1000 meters, 100 meters, 50 meters, 30 meters, 10 meters, 3 meters, 1 meter, or any combination thereof), received RF power (e.g., less than or equal to 1 dBm, 2 dBm, 3 dBm, 4 dBm, 5 dBm, 6 dBm, 7 dBm, 8 dBm, 9 dBm, 10 dBm, 20 dBm, 30 dBm, 40 dBm, 50 dBm, 60 dBm, 70 dBm, 80 dBm, 100 dBm, or any combination thereof), or time delay (e.g., 1 picosecond, 2 picoseconds, 3 picoseconds, 4 picoseconds, 5 picoseconds, 10 picoseconds, 20 picoseconds, 20 picoseconds, 30 picoseconds, 40 picoseconds, 50 picoseconds, 1 nanosecond, 2 nanoseconds, 3 nanoseconds, 4 nanoseconds, 5 nanoseconds, 10 nanoseconds, 20 nanoseconds, 30 nanoseconds, 40 nanoseconds, 50 nanoseconds, 1 microsecond, 2 microseconds, 3 microseconds, 4 microseconds, 5 microseconds, 10 microseconds, 20 microseconds, 30 microseconds, 40 microseconds, 50 microseconds, 1 milliseconds, 2 milliseconds, 3 milliseconds, 4 milliseconds, 5 milliseconds, 10 milliseconds, 20 milliseconds, 30 milliseconds, 40 milliseconds, 50 milliseconds; 1 second, 2 seconds, 3 seconds, 4 seconds, 5 seconds, 10 seconds, 20 seconds, 30 seconds, 40 seconds, 50 seconds, 1 minute, 2 minutes, 3 minutes, 4 minutes, 5 minutes, or any combination thereof).

FIG. 2A is a flow diagram of the operations taken by a server 104 and two client devices in an example process 200A for receiving data associated with a client device at a location and displaying dynamic information based on a recommendation engine, according to a described implementation. In some implementations, process 200A may be performed by computing devices shown in FIG. 1, such as server 104, first client 102, and second client 106. In some implementations, process 200A may be performed by any number of servers and any number of client devices. In general, process 200A includes receiving client data associated with a second client (operation 203A), receiving data recommended based on the client data (operation 205A), dynamically changing an interface based on the recommended data (operation 207B). Process 200A optionally includes receiving a unique identifier (e.g., unique identifier 112) associated with the second client (operation 201A), handling API calls associated with the unique identifier (operation 202A), handling API calls associated with the client data (operation 204A), handling API calls associated with the recommended data (operation 206B), and checking whether a third client joins the network (operation 207A).

At operation 201A, first client 102 receives a unique identifier (e.g., unique identifier 112) from second client 106. In some implementations, second client 106 may receive unique identifier 112 from first client 102. In some implementations, second client 106 may send unique identifier 112 to first client 102. Additionally, first client 102 may send unique identifier 112 to second client 106. In some implementations, second client 106 may send unique identifier 112 via a Bluetooth signal. For example, second client 106 may pair with first client 102 via a Bluetooth connection. In another example, second client 106 may transmit unique identifier 112 to first client 102 without pairing via a Bluetooth signal using advertising mode or friendly name. In another example, first client 102 may transmit unique identifier 112 to second client 106 without pairing via a Bluetooth signal using advertising mode or friendly name. In some implementations, first client 102 may receive unique identifier 112 from second client 106 via near field communication (NFC). In some implementations, first client 102 may scan for unique identifier 112. For example, first client 102 may scan a quick response (QR) code and decode it for the unique identifier. In another example, first client 102 may scan a radio-frequency identification (RFID) tag for unique identifier 112. In another example, first client 102 may receive unique identifier 112 from second client 106 via Wi-Fi. In another example, first client 102 may receive unique identifier 112 from second client 106 via sound waves. In another example, first client 102 may receive unique identifier 112 from second client 106 via a camera, a video camera feed, or any other method of communication including but not limited to antennas, transmitters, receivers, wire terminals, Ethernet ports, Wi-Fi transceivers, Bluetooth, Bluetooth Low Energy, near field communication (NFC), ultrasonic sounds, radio-frequency identification (RFID), motion sensors, ultrasound, weight sensors, laser sensors, etc. In some implementations, a second user of second client 106 may communicate unique identifier 112 to a first user of first client 102. First client 102 may then use unique identifier 112 to retrieve client data 110 associated with second client 106 from either server 104 or second client 106. In some implementations, second client 106 may retrieve information from first client 102 in the same methods listed above.

In some implementations, first client 102 may already be configured to hold unique identifier 112 of the second client 106. For example, when a client device (e.g., second client 106) joins network 101, it may share its unique identifier 112 with server 104. In turn, server 104 may send unique identifier 112 associated with second client 106 to first client 102 for first client 102 to store locally. In another example, when a client device (e.g., second client 106) joins network 101, it may share its unique identifier 112 with first client 102. In some implementations, second client 106 may be configured to already hold unique identifier 112 of first client 102. In some implementations, a user of first client 102 may configure first client 102 to hold unique identifier 112 associated with second client 106. In some implementations, first client 102 may retrieve client data 110 associated with the configured unique identifiers 112 without the approval of a first user. For example, a client device (e.g., first client 102, second client 106) may poll for client data 110 associated with unique identifier 112 based on a time interval (e.g., every second, every minute, every hour, every day, every month, or any combination thereof). In another example, a client device (e.g., first client 102 or second client 106) may detect data or parameters through a sensor and automatically retrieve client data 110 based on unique identifiers 112. Likewise, in some implementations, second client 106 may retrieve client data 110 of the configured unique identifiers 112 without the approval of a first user.

Still referring to operation 201A, a computing device (e.g., first client 102, server 104, or second client 106) may determine the proximity of another client device on network 101. In some implementations, first client 102 may determine that second client 106 is within a predetermined range from first client 102 and request unique identifier 112 of second client 106 in response to that determination. In some implementations, second client 106 may determine that first client 102 is within a predetermined range from second client 106 and request unique identifier 112 associated with first client 102 in response to that determinations. In another example, second client 106 may determine that first client 102 is within a predetermined range (e.g., less than or equal to 1000 meters, 100 meters, 50 meters, 30 meters, 10 meters, 3 meters, 1 meter, or any combination thereof) from second client 106 and, in response to this determination, send unique identifier 112 associated with second client 106 to first client 102. First client 102 may determine that the location ("second location" or location data 117) of second client 106 is relatively closer to itself as compared to the location of other clients. For example, first client 102 may detect that the power of the Bluetooth Low Energy signal received from second client 106 is greater than the power of the Bluetooth Low Energy signals received from any other client device and thus determine that second client 106 is closes to first client 102. In another example, second client 106 may determine that first client 102 is relatively close to second client 106 in comparison to distances that other clients are to first client 102. The comparison of the first location and the second location may be a determination of a distance between the first location and the second location. Server 104 may determine that the distance is within (or less than) a predetermined range (e.g., less than or equal to 1000 meters, 100 meters, 50 meters, 30 meters, 10 meters, 3 meters, 1 meter, or any combination thereof). The distance may be determined as a geographical distance, for instance using flat-surface formulae, spherical-surface formulae, or an ellipsoidal-surface formula. The predetermined range may be a default value, defined by first client 102, second client 106, or server 104. In some implementations, server 104 may determine that the distance between the first location and the second location is greater than the predetermined range. In some implementations, server 104 may compare the first location with the second location using a geographic hierarchy. For example, the second location may specify a city, zip code, physical address, or place of interest. The predetermined range may specify that the second location must be within the same city, zip code, physical address, or place of interest as the first location. In some implementations, server 104 may compare the first location with the second location using a network characteristic specified by the predetermined range. For example, the predetermined range may specify a range of IP addresses and server 104 may determine whether second client 106 at the second location has an application programming interface (API) address that is within the range of IP addresses. In other implementations, first client 102 or second client 106 may perform or be at the receiving end of any or all of the systems and methods included above.

In some implementations, first client 102, second client 106, or server 104 may determine a plurality of distances or proximal values, and determine one or more entries from the plurality of entries that are within a predetermined range from the first location. For example, server 104 or second client 106 may find a plurality of clients that match the characteristics or distance requirements needed to determine that a client is within proximity of first client 102, in response to that determination, server 104 or second client 106 may process the entries.

At operation 202A, a computing device (e.g., first client 102, second client, or server 104) may handle API calls associated with unique identifier 112. The API calls may be part of client data 110 or unique identifier 112. The API call may include one or more parameters. For example, a plug-in identifier which may be passed in as a parameter of an API call. A plug-in may include, for example, a chat program, or an advertisement. In some implementations, the API call may include accessing a database (e.g., data storage 108) to modify or create client data 110. For example, a pillow fight plug-in may make an API call that updates a document in a database (e.g., data storage 108) that stores a time and location of an event. In some implementations, an API call may generate a unique identifier (e.g., unique identifier 112) or include a unique identifier such that it comprises the client data (e.g., client data 110) and/or a location (e.g., location data 117) of first client 102 or second client 106.

At operation 203A, first client 102 may receive client data (e.g., client data 110) associated with a second client. In some implementations, a first client (e.g., first client 102) may receive the client data from a second client (e.g. second client 106). In some implementations, a first client may receive the client data associated with second client 106 from a server (e.g., server 104). First client 102 may request client data 110 associated with second client 106 from server 104 using unique identifier 112 associated with second client 106. First client 102 may receive client data 110 associated with second client 106 from server 104 in response to sending a request to server 104, the request comprising unique identifier 112. In some implementations, first client 102 may retrieve client data 110 associated with a unique identifier (e.g., unique identifier 112) after determining that the unique identifier is within a predetermined range from second client 106. In other implementations, first client 102 may request client data 110 of a plurality of clients from server 104 using the unique identifiers of the clients. First client 102 may receive client data 110 from server 104 in response to sending a request to server 104, the request comprising the plurality of unique identifiers. In addition, first client 102 or second client 106 may perform, or be at the receiving end of any or all of the functions listed above.

In some implementations, a first client may receive a unique identifier (e.g., unique identifier 112) or client data (e.g., client data 110) of a third client directly from a second client. For instance, a third client may be out of range of the first client (e.g., first client 102), but in range of the second client (e.g., second client 106). Second client 106 may send client data 110 or unique identifier 112 of the third client to first client 102. This may be done via a Bluetooth Mesh Network or another method in which the proximity of second client 106 to a third client can infer the proximity of the third client to first client 102. In other implementations, the third client may receive client data 110 or unique identifier 112 of first client 102 directly from second client 106. For instance, a third client may be out of range of first client 102, but in range of second client 106. Second client 106 may send client data 110 or unique identifier 112 of first client 102 to the third client. This may be done via a Bluetooth Mesh Network or another method in which the proximity of first client 102 to second client 106 and second client 106 to a third client can infer the proximity of the third client to first client 102. In some implementations server 104 may communicate with first client 102, the proximity of a third device, based on the proximity of second client 106 to first client 102 and second client 106 to the third device.

In some implementations, first client 102 may receive client data 110 from second client 106 after determining that second client 106 is within a predetermined range from first client 102. In another implementation, second client 106 may send client data 110 to first client 102 after determining that second client 106 is within a predetermined range from first client 102. In some implementations, second client 106 may receive client data 110 from first client 102 after determining that first client 102 is within a predetermined range from first client 102.

In some implementations, first client 102 may receive client data 110 of second client 106 directly from second client 106. In some implementations, second client 106 may send its client data 110 via a Bluetooth signal. For example, second client 106 may pair with first client 102 via a Bluetooth connection. In another example, second client 106 may transmit its client data 110 to first client without pairing via a Bluetooth signal using advertising mode or friendly name. In some implementations, first client 102 may receive client data 110 associated with second client 106 from second client 106 via near field communication (NFC). In some implementations, first client 102 may scan for the shared content/profile information. For instance, first client 102 may scan a quick response (QR) code and decode it for client data 110. In another example, first client 102 may scan a radio-frequency identification (RFID) tag for client data 110. In another example, first client 102 may receive client data 110 from second client 106 via Wi-Fi. In another example, first client 102 may receive client data 110 from second client 106 via sound waves. In another example, first client 102 may receive client data 110 from second client 106 via a camera, video feed, or any other method of communication including but not limited to antennas, transmitters, receivers, wire terminals, Ethernet ports, Wi-Fi transceivers, Bluetooth, Bluetooth Low Energy, near field communication (NFC), ultrasonic sounds, radio-frequency identification (RFID), motion sensors, ultrasound, weight sensors, laser sensors, etc. In addition, first client 102 and second client 106 may perform, or be at the receiving end of any or all of the functions listed above.

At operation 204A, server 104 may optionally handle API calls associated with client data 110 of a client device. The API calls may be part of the client data (e.g., client data 110) associated with the client device. The API calls may include one or more parameters. For example, a plug-in identifier may be a parameter of an API call. A plug-in may be associated with a plug-in identifier which may be passed in as a parameter of an API call. A plug-in may include, for instance, a chat program or advertisement. In some implementations, the API call may include accessing a database (e.g. data storage 108) to modify or create client data 110. For instance, a plug-in may make an API call that updates the client data of a device, such as its profile information, to store the other devices in its proximity. In some implementations, an API call may generate a unique identifier (e.g., unique identifier 112) such that the unique identifier comprises the plug-in identifier, shared content, and/or the first location.

At operation 205A, first client 102 may receive recommendation data (e.g., recommendation data 116) to display as it pertains to client data 110 associated with second client 106. Recommendation data may comprise on or more of user information, sensor data, device information, social information, profile information, file, calendar event, document, picture, video, audio, streaming media, rich media, application data, server data, device data, unique identifier, non-unique identifier or profile data, game data, advertisements, or any other data.

In some implementations, first client 102 may receive recommendation data 116 by first sending its client data 110 to server 104. In response to receiving client data 110, server 104 may generate recommendation data 116 based on the client data 110 and deliver the recommendation data 116 to first client 102. In other implementations, first client 102 may recommend data itself via its recommendations engine (e.g., recommendations engine 107 as described in FIG. 3). In other implementations, second client 106 may send recommended data 116 to first client 102 for display on an interface. In another implementation, first client 102 may retrieve recommendation data 116 via a unique identifier (e.g., unique identifier 112) for display on an interface. In some implementations, first client 102 may receive recommendation data 116 associated with a plurality of clients. In another implementation, first client 102 may receive recommended data without receiving client data 110 associated with second client 106. For example, first client 102 may receive recommendation data 116 every Monday at 8 a.m. because it usually receives it despite not receiving client data 110 normally needed to receive such recommended data. Additionally, first client 102 or second client 106 may perform, or be at the receiving end of any or all of the functions listed above.

In other implementations, first client 102 may send recommendation data 116 to second client 106. In other implementations, first client 102 may send to second client 106 a unique identifier referring to the recommendation data 116. In other implementations, first client 102 may alert server 104 to send recommendation data 116 to second client 106. In response to receiving recommendation data 116 from first client 102, second client 106 may change or update its interface to display all or a portion recommendation data 116. In addition, first client 102 or second client 106 may perform, or be at the receiving end of any or all of the functions listed above.

At operation 206A, first client 102 may optionally handle API calls associated with recommendation data 116. The API calls may be part of recommendation data 116. The API calls may include one or more parameters. For example, a plug-in identifier may be a parameter of an API call. A plug-in may be associated with a plug-in identifier which may be passed in as a parameter of an API call. A plug-in may include, for instance, a chat program or advertisement. In some implementations, the API call may include accessing a database (e.g., data storage 108), to modify or create recommendation data 116. For example, a plug-in may make an API call that updates recommendation data 116 in real-time based on the proximity of other computing devices. In some implementations, an API call may generate a unique identifier (unique identifier 112) such that the unique identifier comprises the plug-in identifier, recommended data (e.g., recommendation data 116), shared content/profile information (e.g., client data 110), and or a location (e.g., location data 117).

At operation 207A, first client 102 may dynamically change its interface based on the recommendation data 116. For example, a computing device (e.g., first client 102) located at a gas station may detect an influx of cars entering the gas station via its proximity sensors. In response to the influx, the recommendation engine (e.g., recommendations engine 107) of the computing device may generate price recommendation data that may be used to update the gas price indicators on an interface. In some instances, first client 102 may change a display interface prior to receiving the recommended data. For instance, the display interface may change its price at 8 AM due to a previous day's traffic at that time and without receiving the recommendations data for the day. In some implementations, first client 102 may be connected to another electronic display system not housing the application (e.g., application 370) running on first client 102. For example, first client 102 at a gas station may be stored inside of the cashier's office, but connect its information to the display interfaces outside. In addition, second client 106 may perform, or be at the receiving end of any or all of the functions listed above.

An interface (e.g., interface 205, second screen 501) of a computing device may include any number and/or type of display interface such as a mobile device user interface, electronic display, touch screen, virtual reality environment, augmented reality environment, computing device user interface, TV display interface, gaming system user interface, game interface, cable or dish box interface, radio system interface, satellite radio interface, lighting interface or board, light projection or projection interface, mobile application interface, desktop application interface, web application interface, website, smartwatch interface, wearable eyesight interface, home appliance user interface. An interface may comprise a hardware interface such as, a refrigerator cooling mechanism, a microwave oven functionality, a light switch, an electric key lock mechanism, or any other mechanism in which a hardware device changes based on electrical or mechanical triggering.

At operation 208A, a computing device (e.g., first client 102 or server 104) may optionally check whether an additional client joins the network. For example, when an additional client (e.g., a third client) joins network 101, it may attempt to communicate with server 104 by sending its unique identifier (unique identifier 112) and when this occurs, the computing device proceeds to operation 201A to repeat operations 201A through 207A with respect to the third client. In an alternate example, when an additional client joins network 101, it may send its unique identifier to any other clients (e.g., first client 102, second client 106) connected to network 101 and when this occurs, the computing device proceeds to operation 201A to repeat operations 201A through 207A with respect to the additional client. If the computing device determines that an additional client has not joined the network, then the computing device proceeds to operation 207A to continue updating the interface based on the recommendation data already received.

FIG. 2B is a flow diagram of the operations taken by a server 104 and two client devices in an example process 200B for receiving data associated with a client device at a location and displaying dynamic information based on a recommendation engine, according to a described implementation. In some implementations, process 200B may be performed by computing devices shown in FIG. 1, such as server 104, first client 102, and second client 106. In some implementations, process 200B may be performed by any number of servers and any number of client devices. In general, process 200B includes receiving client data associated with a second client (operation 203B), receiving data recommended based on client data associated with multiple devices (operation 205B), and dynamically changing an interface based on the recommended data (operation 207B). Process 200B optionally includes receiving a unique identifier (e.g., unique identifier 112) associated with the second client (operation 201B), handling API calls associated with the unique identifier (operation 202B), handling API calls associated with the client data (operation 204B), handling API calls associated with the recommended data (operation 206B), and checking whether an additional client joins the network (operation 208B).

At operation 203B, a client device may receive client data associated with multiple clients. Operation 203B may be similar to operation 203A of FIG. 2A. For example, first client 102 may receive client data (e.g., client data 110) associated with multiple clients from one or more of the clients. In some implementations, first client 102 may receive the client data 110 associated with multiple clients from server 104. In some implementations, first client 102 may receive multiple unique identifiers 112 (e.g., unique identifiers 112) associated with multiple clients from one or more of the multiple clients. In some implementations, first client 102 may receive the unique identifier 112 associated with multiple clients from server 104. In some implementations, the multiple clients may send their unique identifiers 112 via a Bluetooth Signal, near field communication (NFC), radio-frequency identification (RFID), Wi-Fi, or another communication method.

At operation 205B, first client 102 may receive recommended data (e.g., recommendation data 116) to display as it pertains to the client data 110 associated with multiple clients. Operation 205B may be similar to operation 205A of FIG. 2A. For example, first client 102 may receive recommended data 116 by first sending the client data 110 associated with multiple clients to server 104. In other implementations, multiple clients may send their recommended data 116 to first client 102 for display on an interface (interface 205, second screen 501). In another implementation, first client 102 may retrieve the recommendation data 116 to display via multiple unique identifiers 112. In another implementation, first client 102 may receive recommendation data 116 without receiving the client data 110 associated with the multiple clients. In some implementations, first client 102 may retrieve the client data 110 associated with multiple unique identifiers 112 after determining that one or more of the multiple unique identifiers 112 are within a predetermined range from first client 102. In another implementation, first client 102 may send the recommendation data 116 to multiple clients via multicast transmission (i.e., simultaneously) or unicast transmission (i.e., one at a time).

At operation 207B, a client device may dynamically change its interface based on recommended data. Operation 207B may be similar to operation 207A of FIG. 2A. In other implementations, multiple clients may change their interfaces based on the recommendation data 116.

Optional operations of process 200B (e.g., operations 201B, 202B, 204B, 206B, and 208B) may be similar to the optional operations of process 200A (e.g., operations 201A, 202A, 204A, 206A, and 208A); respectively. For example, at operation 208B, if the computing device determines that an additional client has not joined the network, then the computing device proceeds to operation 207B to continue updating the interface based on the recommendation data already received; otherwise, process 200B proceeds to operation 201B to repeat operations 201B through 208B.

FIG. 2C is a flow diagram of the operations taken by a server 104 and two client devices in an example process 200C for receiving data associated with a client device at a location and displaying dynamic information based on a recommendation engine, according to a described implementation. In some implementations, process 200C may be performed by computing devices shown in FIG. 1, such as server 104, first client 102, and second client 106. In some implementations, process 200C may be performed by any number of servers and any number of client devices. In general, process 200C includes receiving recommended to display (operation 201C) and dynamically changing an interface based on the recommended data (operation 203C). Process 200C optionally includes handling API calls associated with the recommended data (operation 202C) and checking whether an additional client joins the network (operation 204C).

At operation 201C, a client device receives recommendations data to display on an interface. Operation 201C may be similar to operation 205A of FIG. 2A. In some implementations, first client 102 may receive recommendation data 116 prior to receiving client data 110. For example, first client 102 may receive a particular widget to display at 8:00 a.m. after receiving a similar widget to display on a predetermined number (e.g., 1, 2, 3, 4, 5, 6, 7, 8, 9, 10, 30, or any combination thereof) of previous days. In some implementations, server 104 may send recommendation data 116 to display. In other implementations, first client 102 may recommend data to itself via its internal recommendations engine (e.g. recommendations engine 107). In other implementations, second client 106 may send recommendation data 116 to the first client 102 for display on an interface (e.g., interface 205, second screen 501). In another implementation, first client 102 may retrieve recommendation data 116 for display via a unique identifier.

At operation 202C, a client device receives recommendations data to display on an interface. Operation 202C may be similar to operation 204A of FIG. 1A.

At operation 203C, first client 102 may dynamically change its interface based on the recommended data. Operation 203C may be similar to operation 207A of FIG. 1A.

At operation 204C, a computing device (e.g., first client 102 or server 104) may optionally check whether an additional client joins the network. Operation 204C may be similar to operation 208A of FIG. 1A.

FIG. 2D is a flow diagram of the operations taken by a server 104 and two client devices in an example process 200D for receiving data associated with a client device at a location and displaying dynamic information based on a recommendation engine, according to a described implementation. In some implementations, process 200D may be performed by computing devices shown in FIG. 1, such as server 104, first client 102, and second client 106. In some implementations, process 200D may be performed by any number of servers and any number of client devices. In general, process 200D includes receiving a unique identifier or location data from a second client (operation 201D), calculating the proximity of the second client to the first client (operation 203D), checking whether the proximity of the second client is within a predetermined range of the first client (operation 204D), optionally delivering the proximity data or unique identifier to a server (operation 205D), receiving recommendation data to display as it pertains to the client data of the second client (operation 206D), and dynamically changing an interface based on the recommended data (operation 208D). Process 200D optionally includes handling API calls associated with the location data and unique identifier (operation 202D), handling API calls associated with the recommended data (operation 207D), and checking whether an additional client joins the network (operation 209D).

At operation 201D, first client 102 receives from second client 106, a unique identifier (e.g., unique identifier 112) associated with second client 106 and its location data indicating the location (e.g., location data 117) of second client 106. In some implementations, first client 102 may receive second client's 106 unique identifier 112 or location data via a Bluetooth signal. For example, first client 102 may discover second client 106 as a nearby client device and subsequently send a pair request to second client 106. Second client 106 receives the pair request and stores the pair request in a pair request queue pending instructions from the user of second client 106 to either accept or deny the request to form a wireless connection. Upon acceptance by the user of second client 106, first client 102 may establish the wireless communication session between the two clients, including performing any further handshaking, synchronization, or pairing actions. Conversely, a denial by the user of second client 106 will cause second client 106 to deny or prevent such a connection. In some implementations, first client 102 may receive second client's 106 unique identifier 112 or location data 117 via near field communication (NFC). In some implementations, first client 102 may scan for second client's 106 unique identifier 112 or location data 117. For example, first client 102 may scan a quick response (QR) code and decode it for second client's 106 unique identifier 112 or location data. In another example, first client 102 may scan a radio-frequency identification (RFID) tag for second client's 106 unique identifier 112 or location data 117. In another example, first client 102 may receive second client's 106 unique identifier 112 or location data 117 via Wi-Fi. In another example, first client 102 may receive second client's 106 unique identifier 112 or location data 117 via sound waves. In another example, first client 102 may receive second client's 106 unique identifier 112 or location data 117 via a camera, a video camera feed, or any other method of communication including but not limited to antennas, transmitters, receivers, wire terminals, Ethernet ports, Wi-Fi transceivers, Bluetooth, Bluetooth Low Energy, near field communication (NFC), ultrasonic sounds, radio-frequency identification (RFID), motion sensors, ultrasound, weight sensors, laser sensors, etc. In some implementations, a second user of second client 106 may communicate second client's 106 unique identifier 112 and location data 117 to a first user of first client 102. First client 102 may then use unique identifier 112 to retrieve client data 110 associated with second client 106 from either server 104 or second client 106. In some implementations, second client 106 may retrieve information from first client 102 in the same methods listed above. In some implementations, the unique identifier alone may be used to denote the proximity or location of the first, second client or server At operation 202D, first client 102 may optionally handle API calls associated with location data 117 and a unique identifier 112. Operation 202D may be similar to operation 202A of FIG. 1A.

At operation 203D, first client 102 or server calculates the proximity of second client 106 to first client 102. For example, first client 102 calculates the proximity of second client 106 to first client 102 by subtracting the location (e.g., location data 117) of second client from the location ("first location" as described herein) of first client 102 and generates proximity data (e.g., proximity data 118). Proximity data 118 may comprise the location data 117 and the unique identifier 112 of second client 106. First client may calculate its location ("first location) and second client 106 may calculate its location (e.g., location data 117) based on any of the methods described herein.

At operation 204D, first client or server 102 checks whether second client 106 is within a predetermined range from first client 102. For example, first client compares proximity data 118 to a predetermined range (e.g., less than or equal to 1000 meters, 100 meters, 50 meters, 30 meters, 10 meters, 3 meters, 1 meter, or any combination thereof). If proximity data 118 is greater than or equal to the predetermined range, then second client 106 is not within an appropriate range of first client. In this instance, first client 102 returns to operation 201D to receive new location data from second client 106 and to repeat process 200D. Conversely, if proximity data 118 is less than the predetermined range, then second client 106 is within an appropriate range of first client. In this instance, first client 102 proceeds to operation 205D.

At operation 205D, first client 102 delivers proximity data and a unique identifier to server 104. First client may deliver proximity data 118 to server 104 using any mode of communication described herein, including, for example, Bluetooth, NFC, Wi-Fi, and cellular.

At operation 206D, first client 102 may receive recommendation data (e.g., recommendation data 116) to display as it pertains to client data 110 associated with second client 106. Operation 206D may be similar to operation 205A of FIG. 1A.

At operation 207D, first client 102 may optionally handle API calls associated with recommendation data 116. Operation 207D may be similar to operation 206A of FIG. 1A.

At operation 208D, first client 102 may dynamically change its interface based on the recommendation data 116. Operation 208D may be similar to operation 207A of FIG. 1A.

At operation 209D, first client 102 may optionally check whether an additional client joins the network. Operation 209D may be similar to operation 208A of FIG. 1A.

FIG. 2E is a flow diagram of the operations taken by a server 104 in an example process 200D for receiving data associated with a client device at a location and displaying dynamic information based on a recommendation engine, according to a described implementation. In some implementations, process 200E may be performed by computing devices shown in FIG. 1, such as server 104, first client 102, and second client 106. In some implementations, process 200E may be performed by any number of servers and any number of client devices. In general, process 200E includes receiving client data associated with a second client (operation 201D), storing the client data (operation 202E), receiving, from a first client, proximity data and a unique identifier associated with the second client (operation 203E), retrieving client data associated with a second client by using the unique identifier (operation 204E), generating recommendation data based on the client data (operation 205E), and transmitting the recommendation data to the second client causing the second client to dynamically change its interface (operation 206E), and checking whether new client data is received (operation 207E).

At operation 201E, server 104 receives client data and a unique identifier associated with second client 106. For example, second client 106 sends its client data (e.g., client data 110) and unique identifier (e.g., unique identifier 112) to server 104. Operation 201E may be similar to operation 203B of FIG. 2B. In some implementations, server 104 receives client data 110 and corresponding unique identifier from a plurality of client devices on network 101. In some implementations, the client data 110 and corresponding unique identifier is associated with the sending device. In some implementations, a client device may send, to server 104, a first set of client data 110 and corresponding unique identifier associated with the sending device and a second set of client data 110 and corresponding unique identifier associated with another device.

At operation 202E, server 104 stores the received client data 110 in a database. In some implementations, server 104 stores the client data 110 and unique identifier 112 in a local storage. In some implementations, server 104 stores the client data 110 and unique identifier 112 in a remote location, such as data storage 108. In some implementations, server 104 stores the client data 110 and unique identifier 112 in a data structure format. For example, server 104 may map the client data 110 for a first client (e.g., first client 102) with its corresponding unique identifier (e.g., device identifier) on the first row in the data structure format. Server 104 may map the client data for a second client (e.g., second client 106) with its corresponding unique identifier (e.g., device identifier) on the second row in the data structure format. In some implementations, server 104 stores the client data 110 and unique identifiers 112 for each client device on network 101 data into an array, a linked list, a record, a union, a tagged union, a class, a tree, a queue, or a flat file. In some implementations, server 104 stores the client data 110 and unique identifier 112 for each client device in a flat file by using special characters, such as a comma, a semicolon, a tab, a space, an underscore, or a hyphen. In one implementation, server 104 stores client data 110 and unique identifier 112 for each client device in a comma-separated text file.

At operation 203E, server 104 receives proximity data and a unique identifier 112 associated with the second client. For example, server 104 receives proximity data 118 and a unique identifier 112 associated with second client 106 directly from second client 106. In some implementations, server 104 receives proximity data 118 and a unique identifier 112 associated with second client 106 directly from a third client. In some implementations, proximity data 118 comprises the unique identifier 112 associated with a client device. Server 104 may receive client data 110 and unique identifier 112 from any computing device and by any method described herein.

At operation 204E, server 104 retrieves client data associated with a second client 106 by using the unique identifier. In some implementations, proximity data 118 comprises the unique identifier 112 associated with second client 106. In this instance, server 104 may extract the unique identifier 112 associated with second client 106 from the proximity data 117. In some implementations, server 104 may retrieve client data 110 from a data storage (e.g., data storage 108) by searching the data base using the unique identifier 112. In some implementations, server 104 may send a request to any computing device on network 101 for client data 110 associated with second client 106.

At operation 205E, server 104 generates recommendation data 116 based on the received client data. In some implementations, server 104 generates recommendation data 116 by using its recommendations engine 107, as described herein. In some implementations, server 104 may rely on any other computing device to generate recommendation data 116. For example, server 104 may send a request to first client 102 for first client 102 to use its internal recommendation engine 107 to generate the recommendation data 116 and send the recommendation data 116 to server 104 once generated.

At operation 206E, server 104 transmits the recommendation data 116 to the second client 102. Server 104 may send recommendation data 116 to second client 106 (or any computing device) via a Bluetooth signal, near field communication (NFC), radio-frequency identification (RFID), Wi-Fi, or any other form of communication described herein. In some implementations, the transmitted recommendation data 116 causes a user interface of second client 106 to dynamically change based on the recommendation data 116. In some implementations, the transmitted recommendation data 116 causes a second screen under the control of second client 106 to dynamically change based on the recommendation data 116. In some implementations, second client 106 stores the recommendation data 116 without dynamically changing its user interface. In some implementations, second client 106 sends the recommendation data 116 to another client device (e.g., first client) without dynamically changing its user interface. The recommendation data 116 transmitted from second client 106 to first client 102 may cause first client 102 to dynamically change its interface based on the recommendation data 116.

At operation 207E, server 104 may check whether an additional client joins the network. For example, when an additional client (e.g., a third client) joins network 101, it may attempt to communicate with server 104 by sending its unique identifier (unique identifier 112) and when this occurs, server 104 proceeds to operation 201E to repeat operations 201E through 207E with respect to the third client. If server 104 determines that an additional client has not joined the network, then server 104 proceeds to operation 206E to continue transmits the recommendation data 116 to the second client 102.

FIG. 3 is a block diagram of an example environment 300 receiving data associated with a client device at a location and displaying dynamic information based on a recommendation engine, according to a described implementation. As shown, environment 300 includes a plurality of computing devices, such as first client 102, second client 106, and server 104. In greater detail, first client 102 includes a network interface 305, one or more processors 310, memory 315, and user input/output interfaces (shown in FIG. 3 as I/O interfaces 390). Although not shown, server 104 and second client 106 may each include one or more of the internals of first client 102 and may operate in a similar fashion.

Network interface 305 may have a corresponding module or software that works in conjunction with hardware components. The network interface 305 may allow a computing device (e.g., first client 102, second client 106, and server 104) to communicate with and exchange data with other computing devices (e.g., first client 102, second client 106, and server 104) via the network 101. The network interface may receive data from or transmit data to the processor 310, memory 315, and/or any module or application (e.g., application 370) in memory 315. Network interface 305 may be one or more communication interfaces that includes wired or wireless interfaces (e.g., jacks, antennas, transmitters, receivers, transceivers, wire terminals, Ethernet ports, wireless fidelity (Wi-Fi) transceivers, wireless chipset, air interface, Bluetooth, Bluetooth Low Energy, near field communication (NFC), ultrasonic sounds, radio-frequency identification (RFID), motion sensors, ultrasound, weight sensors, laser sensors) for conducting data communications with local or remote devices (e.g., remote device 602) or systems via the network 101. For example, network interface 305 may allow server 104 to communicate with one or more first clients 102, one or more second clients 106, other servers 104 and one or more databases (e.g., data storage 108). In some implementations, network interface 305 may have corresponding modules or software that work in conjunction with hardware components.

Network interface 305 may receive a dataset from second client 106 comprising client data associated with second client 106 (e.g., client data 110), a unique identifier associated with second client 106 (e.g., unique identifier), data recommended based on its client data (e.g., recommendation data 116) and/or data that indicates the location of second client 106 (e.g., location data 117). In some implementations, network interface 305 may receive the dataset from server 104.

Network interface 305 may receive a request from second client 106 to access or download client data 110. The request may comprise unique identifier 112 and/or location data 117 (e.g., first location, second location, as described herein). In some implementations, network interface 305 may receive a request from second client 106 to access or download recommendation data 116. The request may comprise a unique identifier 112 and/or location data 117. In response to receiving the request, network interface 305 may download client data 110 and/or recommendation data 116 from any of first client 102, second client 106, server 104, or data storage 108. Network interface 305 may send recommendation data 116 from first client 102 to any of second client 106, server 104, or data storage 108. In some implementations, network interface 305 may send a reference to recommendation data 116 from first client 102 to any of second client 106, server 104, or data storage 108. The reference indicates a location where the recommendation data 116 is stored, such as a geographic location (e.g., store name, city, town, state, and country), coordinates, a storage device name (e.g., first client, second client, server, and data storage), an IP address, a memory address. In some implementations, network interface 305 may send client data 110 from first client 102 to any of second client 106, server 104, or data storage 108. In some implementations, network interface 305 may send a unique identifier 112 from first client 102 to any of second client 106, server 104, or data storage 108.

Network interface 305 may send a notification to a second client 106. Network interface 305 may broadcast from first client 102 to a plurality of second clients 106 a notification that proximity manager 345 determines (by the methods as described herein) to be within a predetermined location, proximity, or have entered the unique identifier 112 of first client 102. First client 102 or second client 106 may house, perform, or be at the receiving end of any or all of the systems, methods and functions, as described herein.

Processor 310 may be implemented as a general purpose processor, an application specific integrated circuit (ASIC), one or more field programmable gate arrays (FPGAs), a Central Processing Unit (CPU), a Graphical Processing Unit (GPU), a data processor, a logic device, a group of processing components, or other suitable electronic processing components, or combinations thereof. Processor 310 may be connected directly or indirectly (e.g., via a bus) to the memory 315 and the network interface 305. Processor 310 may read, write, delete, or otherwise access data stored in memory 315 or other components. The one or more processors 310 may be configured to execute program instructions stored in memory to perform one or more operations described herein. Processors 310 and memory 315 may form a processing module.

Memory 315 may include, but is not limited to, any type of volatile, non-volatile memory, media, memory device, electronic, optical, magnetic, semiconductor memory device, or any other storage or transmission device capable of providing processor with program instructions and/or data. Memory 315 may include an optical disk, magnetic disk, hard disks, internal disks, removable disks, magneto-optical disks, memory chip, read-only memory (ROM), random-access memory (RAM), Electrically Erasable Programmable Read-Only Memory (EEPROM), erasable programmable read only memory (EPROM), flash memory, or any other suitable memory from which processor can read program instructions and/or data. Memory 315 may include database components (e.g., content database 380, server database 385), object code components, script components, or any other type of information structure for supporting the various activities and information structures described in the present disclosure. In some implementations, memory 315 is communicably connected to processor 310 and includes programs instructions (e.g., data modules stored in memory 315) for executing one or more processes described herein.

The program instructions stored in memory 315 may include code and/or data from any suitable machine-readable code or source code. The machine code may be from source code, which may be in one or more computer programming languages (including scripting language or markup language) such as, but not limited to, ACTIONSCRIPT®, C, C++, C#, Cascading Style Sheets (CSS), DART®, ECMASCRIPT®, Extensible Markup Language (XML), JAVA®, JAVASCRIPT® including JACASCRIPT® Object Notation (JSON), PERL®, Hypertext Markup Language (HTML), PYTHON®, Typescript, VBScript, VISUAL BASIC®, or any other language.

In brief overview, memory 315 is shown to include a network module 320, an interface manager 325, and a content database 380. Memory 315 may further include one or more additional databases such as a server database 385. In some implementations, one or more databases may be connected to the server 104 via the network interface 305 over a network 101.

Still referring to FIG. 3, memory 315 is shown to include a network module 320. The network module 320 may work together with the network interface 305 to receive and transmit data via the network 101. The network module 320 may be part of an application (e.g., application 370), operating system, kernel, driver, runtime environment, and/or other software. The network module 320 may provide one or more applications or modules in memory 315 access to network 101.

Memory 315 is further shown to include an interface manager 325, which comprises of an optional API call handler 330, a proximity manager 345, a processing manager 350, an optional recommendations engine 107, an optional applications processing module 360, an optional widget handler 365, an interface renderer 368, and an optional application 370. Interface manager 325 may communicate with or operate under a virtual machine, an operating system, kernel, runtime environment and/or other software. For instance, interface manager 325 may operate under an ANDROID runtime environment.

Proximity manger 345 may receive, from the network module 320, a second client's 106 location. Proximity manager 345 may determine that the location of second client 106 is within a predetermined range from first client 102. Proximity manager 345 may also determine that second client 106 is in the proximity of first client 102 via approximation using Bluetooth Low Energy, near field communication (NFC), radio-frequency identification (RFID), or another proximity technology. In another implementation, proximity manager 345 may determine that unique identifier 112 associated with another computing device on network 101 (e.g., second client 106) is within a predetermined distance of first client 102. In other instances, proximity manager 345 may determine that multiple clients are within a predetermined distance from first client 102. In another implementation, proximity manager 345 may determine that multiple clients are within the proximity of first client 102. For instance, first client 102 may scan multiple devices using a radio-frequency identification (RFID) scanner as they leave a particular location. Proximity manager 345 may notify second client 106 that is within the proximity of first client 102. In another instance, proximity manager 345 may notify server 104 that second client 106 is in the proximity of first client 102. In other implementations, proximity manager 345 may query server 104 for the location ("second location" as described herein) of a second client 106 before determining that second client 106 is within the proximity of first client 102.

Processing manager 350 may receive, from the proximity manger 345 or network module 320 information pertaining to the locations of the clients in the proximity of first client 102. For instance, processing manager 350 may receive the energy signal strengths of the associated clients within it proximity. In some implementations, processing manager 350 may process the information received. In some instances, processing manager 350 may link multiple clients together during their processing. For instance, processing manager 350 may determine that a device was near a device via Bluetooth and near another device via radio-frequency identification (RFID), and link the two devices together. In other implementations, processing manager 350 may receive constants referring to the distance, from first client 102, of the clients within its proximity. In some implementation, processing manager 350 may process this data to determine which client is closest to first client 102. In other implementations, processing manager 350 may parse multiple forms of data and configure them to be ingested by an API or another function running on first client 102.

Recommendations engine 107 may receive data from proximity manager 345, processing manager 350, or API call handler 330 pertaining to the client data 110 of computing devices deemed to be within the proximity of first client 102. In some implementations, recommendations engine 107 may receive other data to be processed. In some implementations, recommendations engine 107 may contact content database 380 and use its data. In other implementations, recommendations engine 107 may contact server database 385 through a network 101. Recommendations engine 107 may compare the client data 110 with another dataset to determine what data best matches the client data 110 associated with that client. For instance, recommendations engine 107 may determine that a set of Baseball tickets best matches the client data 110 received from a 35 year-old dad. In some implementations, recommendations engine 107 may receive multiple sets of client data 110 associated with multiple clients. Recommendations engine 107 may compare this data with another dataset. In other implementations, recommendations engine 107 may compare multiple datasets (e.g., client data 110) with the client data 110 associated with and received from the client devices within first client's 102 proximity to determine the best possible match among those data sets. Recommendations engine 107 may recommend data based on, a statistical method, time analysis equation, regression formula or method, machine learning algorithm, date analysis algorithm, date analysis equation, polynomial function, or k-factor function. Although FIG. 3 shows recommendations engine 107 housed within first client 102, recommendations engine 107 may be housed within server 104, first client 102, second client 106, or any combination thereof. First client may access recommendations engine 107 via a network 101.

Applications processing module 360 may receive recommendation data 116 from recommendations engine 107, API call handler 330, or processing manager 350. In some implementations, applications processing module 360 may pass recommendation data 116 to a function to further process the data to be used by interface renderer 368. For instance, the applications processing module may randomize an instance of a recommended object to display recommendation data 116 received from recommendations engine 107. In another implementation, applications processing module 360 may ask for more recommendation data 116 from the recommendations engine 107, processing manager 350, or API call handler 330.

Widget handler 365 may contain widget information received from server 104 or another client (e.g., second client 106) explaining how to display recommendation data 116 received from the recommendations engine 107 or another module. In another implementation, widget handler 365 may use data on first client 102 or second client 106 pertaining to a widget to display using interface renderer 368. In another implementation, second client 106 may send widget information to first client's 102 widget handler 365. In another implementation, widget handler 365 may download widget data from server 104 or via network 101.

Interface renderer 368 may receive recommendation data 116 and display instructions from API call handler 330, proximity manager 345, processing manager 350, recommendations engine 107, applications processing module 360, widget handler 365, application 370, content database 380, server database 385, or server 104. Interface renderer 368 may also receive data over network 101 from another source. In some implementations, interface renderer 368 may display recommendation data 116 on a user interface. In other implementations, interface renderer 368 may run a hardware functionality. For instance, interface renderer 368 may receive recommendation data 116 to turn on a living room light, and may do so. In some implementations, interface renderer 368 may change the interface in real-time after receiving recommendation data 116 to display. In some implementations, interface renderer 368 may interface with a user via a touch interface or another user interface. In some implementations, interface renderer 368 may change prior to receiving touch input or another form of input from a user.

Application 370 may be an application, applet, script, service, daemon, routine, or other executable logic for receiving content (e.g., client data 110, recommendation data 116, and proximity data 118) and for transmitting responses, commands, notifications, or other data. In one implementation, application 370 may be a web browser, while in another implementation, application 370 may be a media presentation application. Application 370 may include functionality for displaying content received via network interface 305 and/or generated locally by processor 310, and for transmitting interactions received via I/O interface 390, such as requests for websites, location data (e.g., location data 117), client data (e.g., client data 110), references to a device or its client data (e.g., unique identifier 112), and/or recommendation data (e.g., recommendation data 116) from other client devices, input text strings, etc.

Collection agent 375 may include an application plug-in, application extension, subroutine, browser toolbar, daemon, or other executable logic for collecting data processed by application 370 and/or monitoring interactions of a user with I/O interface 390. In other implementations, collection agent 375 may be a separate application, service, daemon, routine, or other executable logic separate from application 370 but configured for intercepting and/or collecting data processed by application 370, such as a screen scraper, packet interceptor, API hooking process, or other such applications.

API call handler 330 may be connected to proximity manager 345, processing manager 350, recommendations engine 107, applications processing module 360, widget handler 365, interface renderer 368, and application 370. API call handler 330 may execute one or more API calls made by first client 102 or second client 106. The API calls from first client 102 may be associated with client data 110, unique identifier 112, and/or recommendation data 116 of second client 106. The API calls from second client 106 may be triggered from a request from first client 102 and may be associated with or include recommendation data 116 or client data 110 of first client 102 or second client 106. API call handler 330 may receive one or more parameters for an API call. One of the parameters may be a plug-in identifier. API call handler 330 may pass one or more parameters to a plug-in module (not shown) or a widget module handled by the widget handler 365.

Memory 315 may include a content database 380. Content database 380 may be a document-oriented database, a relations database, object model database, a structure query language (SQL) database, a not-only SQL (NoSQL) database, or any other type of database. In some implementations, content database 380 may be a cross-platform document-oriented database program, such as MongoDB. Content database 380 may connect to server 104 via network 101. Content database 380 may receive content (e.g., client data 110) from interface manager 325, API call handler 330, applications processing module 360, or widget handler 365. Content database 380 may receive client data 110 from any computing device connected to network 101. Content database 380 may store a plurality of client data 110 from a plurality of computing devices (e.g., first client 102, second client 106, and server 104). Client data 110 may be stored with tags to be used by recommendations engine 107. Content database 380 may be queried with a unique identifier to determine the content associated with a unique identifier. In some implementations, content database 380 may include a plurality of unique identifiers 112 and a plurality of client data 110. Proximity manager 345, processing manager, recommendations engine 107, applications processing module 360, widget handler 365, and interface renderer 368 may access or modify data from content database 380.

Memory 315 may optionally include a server database 385. In some implementations, server database 385 may be included with content database 380. In some implementations, server database 385 may reside on another computing device to be connected to via network 101. In some implementations, server database 385 may be a document-oriented database, a relational database, object module database, a structure query language (SQL) database, a not-only SQL (NoSQL) database, or any other type of database. Server database 385 may connect to server 104 via network 101. Server database 385 may store one or more accounts associated with first client 102 and second client 106. Server database 385 may store client data 110 associated with first client 102 or second client 106. Server database 385 may store a plurality of unique identifiers 12 or location data 117 associated with first client 102 or second client 106. Proximity manager 345, processing manager 350, recommendations engine 107, applications processing module 360, widget handler 365, and interface renderer 368 may access or modify data from server database 385.

I/O interface 390 may be any electronic device that conveys data to a user by generating sensory information (e.g., a visualization on a display, one or more sounds, tactile feedback, etc.) and/or converts received sensory information from a user into electronic signals (e.g., a keyboard, a mouse, a pointing device, a touch screen display, a microphone, etc.). The one or more I/O interfaces 390 may be internal to the housing of a computing device, such as a built-in display, touch screen, microphone, etc., or external to the housing of first client 102, such as a monitor connected to first client 102, a speaker connected to first client 102, etc., according to various implementations. I/O interface 390 may be electronic display, a touch screen, a virtual reality display, an augmented reality display, a speaker, a projector/projection, a printer, a gamepad, a camera, a video camera, an infrared camera, a scanner, etc.)

Server 104 may include one or more of the internal components of first client 102 (e.g., a network interface 305, one or more processors 310, memory 315, and I/O interfaces 390) and may operate in a similar fashion. Server 104 may also include a database or be configured to communicate with a database (e.g., data storage 108). Server 104 may be part of an infrastructure provider or a cloud computing platform. Server 104 connects to network 101 and be configured to communicate with any computing device on network 101, such as a first client 102 and a second client 106. In some implementations referred to as headless servers, server 104 may not include an I/O interface 390, but may communicate with first client 102 and second client 106 via network 101. In some implementations, memory 315 of server 104 may store one or more applications 370 for execution by processor 310 of server 104, including File Transfer Protocol (FTP) servers, web servers, mail servers, file sharing servers, peer-to-peer servers, or other such applications for receiving data (e.g., client data 110, unique identifier 112, recommendation data 116, and/or location data 117) from a client device, sending the same data to client devices, and sending notifications to client devices. In some implementations, server 104 may generates recommendation data 116 to send to any client device on network 101.

Figure 4:
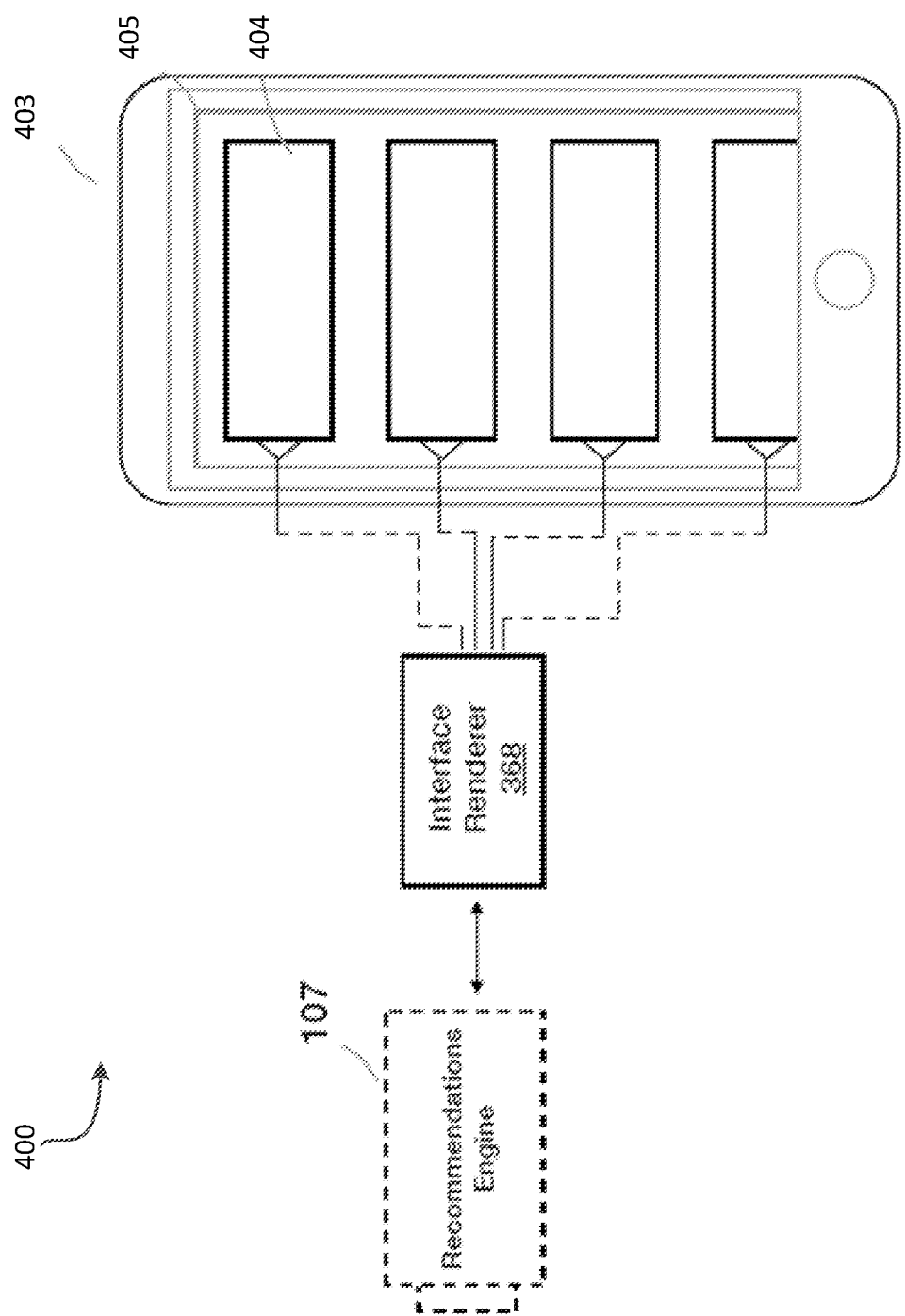
FIG. 4 is a block diagram of an example environment 400 depicting an interface adapting based on data received from a computer program, according to a described implementation.

FIG. 4 is a block diagram of an example environment 400 depicting an interface adapting based on data received from a computer program, according to a described implementation. Recommendations engine 107 may send recommendation data 116 and display requirements (e.g., resolution, screen format, scale, color format, frame rate) to an interface renderer 368 for display on interface 205. Interface renderer 368 may control interface 405 on device 403.

Device 403 may be any device with an interface including but not limited to a smartphone, smart tablet, smart watch, smart TV, connected device, hardware Internet of Things (IoT) device (e.g., a smart refrigerator, smart meter), or any other device discussed herein or applicable to any of the computing devices discussed herein. Device 403 may include an interface 405 that can include one or more interface components 404. For instance, an interface component 404 could be a card, video, piece of text, a message, menu item, widget or any other interface item. In some implementations, an interface component 404 may be located in hardware or refer to a state of a hardware device such as "on", or "brewing (in a coffee maker)". Any of the items mentioned above can be implemented in any number of implementations. The elements described above are only to show an illustrative instance of a dynamic interface and are not meant to be limiting or limited to any of the details described above.

In another implementation, interface 405 may change dynamically based on recommendation data 116 (or any other data) received into interface renderer 368. For instance, interface 405 may include food items arranged in a menu format that updates based on recommendation data 116. Interface 405 could also change its ordering such that a new interface component 404 existed at the top of the list. In some implementations, interface 405 and interface components 404 may be declarative in fashion. For example, a computer program may define interface 405 with a set of declarative rules using a system such as React JS or Angular JS. These rules could be generic in nature and dynamically change based on the recommended data (e.g., recommendation data 116) received. For instance, a menu item (a "coke") may display differently than another menu item (a "steak"). Interface 405 may hold the rendering methods before or after receiving the recommended data and instructions for how to display the recommended data. In some implementations, interface renderer 368 may process a set of instructions to display the recommended data such as cascading style sheets (CSS), React JS, Angular JS, Adaptive interfaces (iOS), Android adaptive interface, interface builder, jQuery, jQuery mobile, NodeJS, Ruby on Rails, Django, EmberJS, JavaScript, embedded JavaScript templates (EJS), Handlebars, Meteor.JS, React Native, or Jade. In some implementations, the interface renderer may change or adapt a piece of hardware, or send instructions to a piece of hardware to adapt. For instance, interface renderer 368 may turn off a light in room number 3 and dim a light in room number 2.

Figure 5A:
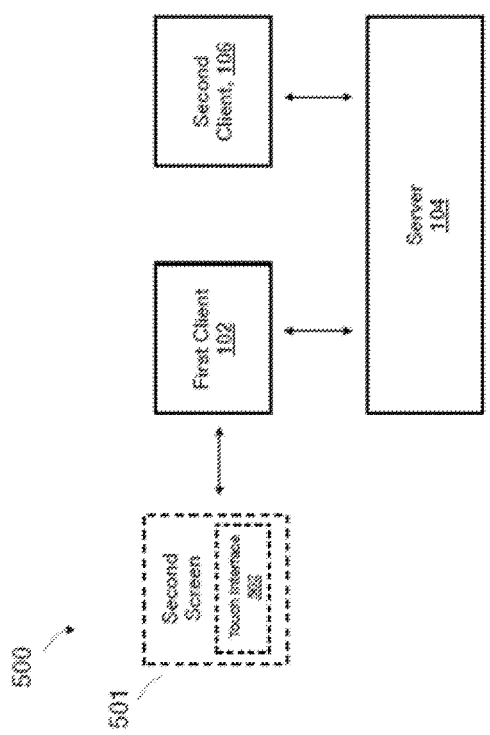
FIG. 5A is a block diagram of an example environment 500A for adapting an interface of a second screen 501 based on the proximity of two computing devices, according to a described implementation.

FIG. 5A is a block diagram of an example environment 500A for adapting an interface of a second screen 501 based on the proximity of two computing devices, according to a described implementation. The environment 500A includes a network 101 (not shown), a first client 102, a second client 106, a server 104, and a second screen 501. In some implementations, second screen 501 may include a touch screen interface 502. Each computing device in FIG. 5A may operate similar to the computing device in FIG. 1

Second screen 501 may have a wired or wireless connection to first client 102. For instance, second screen 501 may use a broadcast mechanism such as Airplay, HDMI, Wi-Fi, Bluetooth, video graphics array (VGA), or another mirroring application, software, piece of hardware or combination thereof. Second screen 501 may hold some or all of the components of first client 102. Second screen 501 may be a projection of the interface of first client 102. For instance, first client 102 may rest (or be used) while second screen 501 displays the adaptive user interface.

Second screen 501 may optionally have a touch interface 502. In some implementations, second screen 501 may change its recommended data (e.g., recommendation data 116) and interface dynamically based on the user's touch. In some implementations, touch interface 502 may superimpose a path on touch interface 502 indicating where the location on touch interface that the user touched. In some implementations, touch interface 502 may maintain the path on touch interface 502 for a predetermined time period (e.g., 1 second, 2 seconds, 3 seconds, 4 seconds, 5 seconds, 10 seconds, 30 seconds, 60 seconds, indefinitely, or any combination thereof) In some implementations, touch interface 502 may record the user's touch path in a database (e.g., data storage 108). In some implementations, touch interface 502 may send the record to first client 102, server 104, or second client 106.)

In some implementations, second screen 501 may determine its proximity to first client 102 or second client 106. In some implementations, second screen 501 may operate and function based on the proximity of first client 102 or second client 106. Some or all of the implementation systems and methods described herein pertaining to first 102 or second client 106 may apply to second screen 501. Second screen 501 may operate independently of first client 102. For instance, second screen 501 may connect to first client 102 over the web and be accessed through a web site address. In some implementations, second screen 501 may connect to a remote instance of first 102 or second client 106 running on first 102 or second client 106 or a server 104. In some implementations, a plurality of second screens 501 may be connected to one or more of the computing device described in environment 100A, environment 100B, environment 500A, or environment 500B.

Figure 5B:
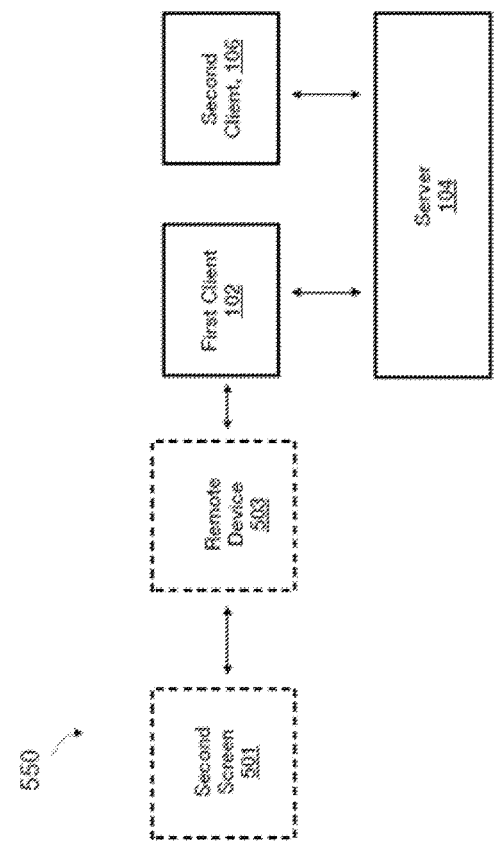
FIG. 5B is a block diagram of an example environment 500A for adapting an interface of a second screen 501 via a remote device 503 based on the proximity of two computing devices, according to a described implementation.

FIG. 5B is a block diagram of an example environment 500A for adapting an interface of a second screen 501 via a remote device 503 based on the proximity of two computing devices, according to a described implementation. The environment 500A includes a first client 102, a second client 106, a server 104, and a second screen 501. In some implementations, second screen 501 may include a touch screen interface 502 (not shown). In some implementations, environment 500A may include an optional remote device 503 and optional sensor 604 (not shown).

Remote device 503 may be similar to any other computing device described in FIG. 1. For example, remote device 503 may house some or all of the systems and methods of second screen 501, first client 102, second client 106, or server 104. Remote device 503 may connect to first client 102 via a wireless connection or wired connection. In some instances, remote device 503 may serve as an interface to first client 102, second client 106, or second screen 501. For instance, remote device 503 may be a controller or a dongle in which to control functionality housed on first client 102, second client 106, second screen 501, or server 104. Remote device 503 may connect to second screen 501 via a wireless connection or wired connection.

Remote device 503 may include additional hardware components, such as sensor 604, to gather multiple forms of data (e.g., movement, temperature, vibration, sound, optical, odor). Sensor 604 may be a camera, a motion sensor, an accelerometer, gyro sensor, an infrared sensor, or a temperature sensor. Remote device 503 may connect to, or perform similar functions as first client 102 or second client 106. In some implementations, remote device 503 may perform the same functionality as second client 106. In some implementations, remote device 503 may handle some or all of the processing load of first 102, second client 106, or the server 104. In some implementations, remote device 503 may be connected to second screen 501. In some implementations, a plurality of remote devices 503 may be connected to one or more of the computing device described in environment 100A, environment 100B, environment 500A, or environment 500B.

Figure 6:
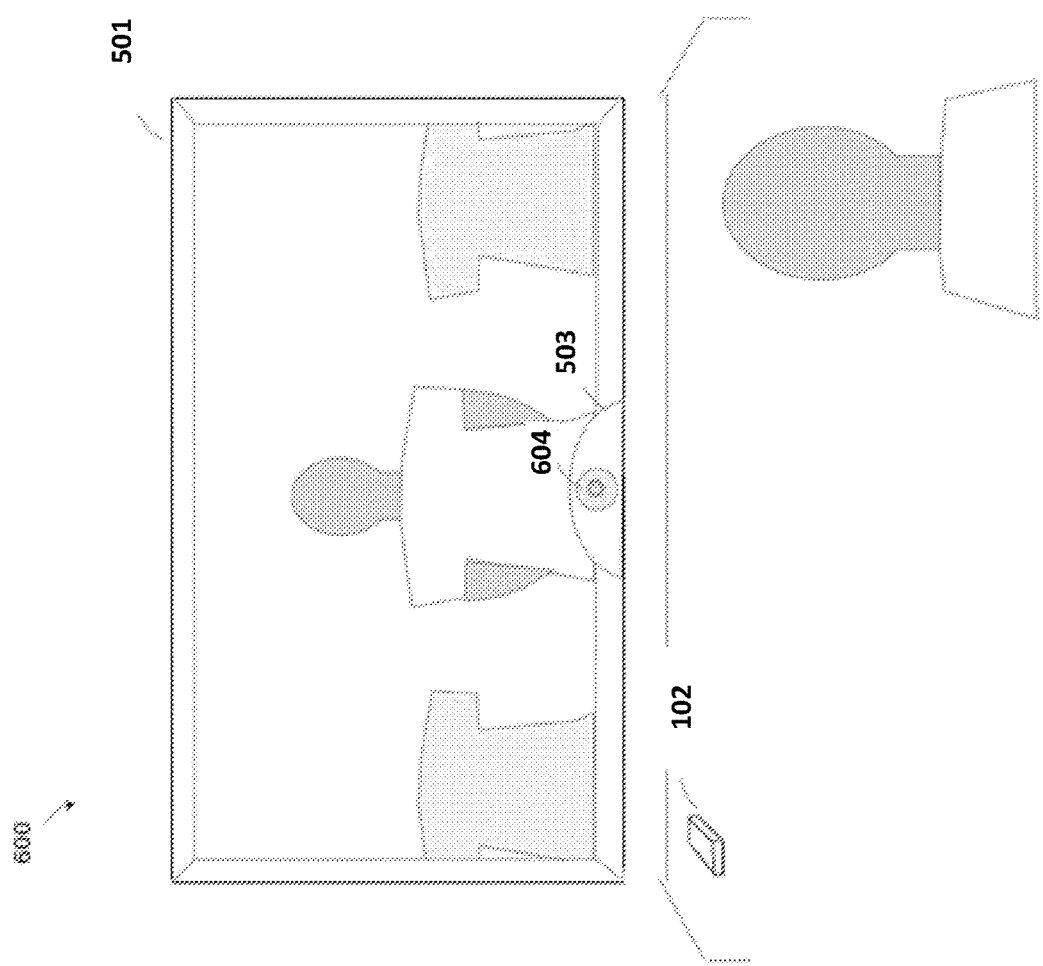
FIG. 6 is an illustration of an example system 600 depicting an adaptive user interface overlaid on top of a second screen 601, according to a described implementation.

FIG. 6 is an illustration of an example system 600 depicting an adaptive user interface overlaid on top of a second screen 601, according to a described implementation. Any of the items mentioned below can be implemented in any number of implementations. The elements described below are only to show an illustrative instance of a dynamic interface and are not meant to be limiting or limited to any of the details described below. System 600 includes a first client 102, a remote device 503, an optional sensor 604, and second screen 501. First client 102 connects to remote device 503 and second screen 501 via network 101 (not shown). As described herein, network 101 may be any type of network, such as Wi-Fi, Bluetooth, and NFC, cellular. In some implementations, first client 102 connects to remote device 503 and second screen 501 via one or more wired connections (e.g., twisted pair, coaxial cable, fiber optic cable, Ethernet cable).

In general, the present illustration of example system 600 depicts a smartphone (e.g., first client 102) connected to a smart mirror (e.g., second screen 501). In some implementations, the smartphone may connect to a server 104 (not shown) and server 104 may connect to a smart mirror. The smart mirror of example system 600 holds a second screen 501 and a remote device 503 as its base. In this instance, second screen 501 (i.e., the "smart mirror") detects the proximity of first client 102 and sends the proximity data to first client 102. In response to receiving the proximity data, first client 102 sends all or a portion of its client data (e.g., client data 110) to second screen 501 causing second screen 501 to display the received client data on its interface. For example, client data (such as profile information) locally stored on first client 102 may illustrate a particular item of clothing, such as hat, when displayed on an interface. First client 102 may retrieve its locally stored client data and send it to second screen 501 causing the clothing item to appear on the interface of second screen 501.

Second screen 501 may house a remote device 503. Remote device 503 may house a sensor 604 for gathering and recording data. For example, sensor 604 may be a camera that takes in motion data from the user. Remote device 503 processes the data gathered from the camera and superimpose images onto second screen 501 to match the location and dimensions of the user's body. In some implementations, second screen 501 may include a projection mechanism, thereby classifying second screen 501 as an augmented reality interface.

In many implementations, data collected about a user of a computing device (e.g., first client, second client, etc.) may be anonymized or disambiguated to protect privacy. In many implementations in which personal information about the user of client device may be collected for measurement or used to select third-party content, the user may be provided with an opportunity to control whether programs or features that may collect personal information (e.g., information about a user's social network, social actions or activities, a user's preferences, or a user's current location) do so, or an opportunity to control whether or how to transmit data to a server (e.g., server 104). In addition, certain data (e.g., client data 110, unique identifier 112, recommendation data 116, location data 117, and/or proximity data 118) may be treated in one or more ways before it is stored or used by server 104, so that personally identifiable information is removed when generating parameters (e.g., demographic parameters). A user's identity may be anonymized so that no personally identifiable information can be determined for the user, or a user's geographic location may be generalized where location information is obtained (such as to a city, ZIP code, or state level), so that a particular location of a user cannot be determined. Thus, the user may have control over how information is collected about him or her and used by server 104.

Implementations of the subject matter and the operations described in this specification may be implemented in digital electronic circuitry, or in computer software, firmware, or hardware, including the structures disclosed in this specification and their structural equivalents, or in combinations of one or more of them. Implementations of the subject matter described in this specification may be implemented as one or more computer programs, i.e. one or more modules of computer program instructions, encoded on one or more computer storage medium for execution by, or to control the operation of, data processing apparatus. Alternatively, or in addition, the program instructions may be encoded on an artificially-generated propagated signal (e.g., a machine-generated electrical, optical, or electromagnetic signal) that is generated to encode information for transmission to suitable receiver apparatus for execution by a data processing apparatus. A computer storage medium may be, or be included in, a computer-readable storage device, a computer-readable storage substrate, a random or serial access memory array or device, or a combination of one of more of them. Moreover, while a computer storage medium is not a propagated signal, a computer storage medium may be a source or destination of computer program instructions encoded in an artificially-generated propagated signal. The computer storage medium may also be, or be included in, one or more separate components or media (e.g., multiple disks, or other storage devices). Accordingly, the computer storage medium is both tangible and non-transitory.

The operations described in this disclosure may be implemented as operations performed by a data processing apparatus on data stored on one or more computer-readable storage devices or received from other sources.

The term "client or "server" include all kinds of apparatus, devices, and machines for processing data, including a programmable processor, a computer, a system on a chip, or multiple ones, or combinations, of the foregoing. The apparatus may include special purpose logic circuitry, e.g., a field programmable gate array (FPGA) or an application specific integrated circuit (ASIC). The apparatus may also include, in addition to hardware, code that creates an execution environment for the computer program in question (e.g., code that constitutes processor firmware, a protocol stack, a database management system, an operating system, a cross-platform runtime environment, a virtual machine, or a combination of one or more of them). The apparatus and execution environment may realize various different computing model infrastructures, such as web services, distributed computing and grid computing infrastructures. A "client" may also comprise of a system of one or more clients or servers. A "server" may comprise of one or more servers or clients.

The systems and methods of the present disclosure may be completed by any computer program. A computer program (also known as a program, software, software application, script, or code) may be written in any form of programming language, including compiled or interpreted languages, declarative or procedural languages, and it may be deployed in any form, including as a stand-alone program or as a module, component, subroutine, object, or other unit suitable for use in a computing environment. A computer program may, but need not, correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program may be deployed to be executed on one computer or on multiple computers that are located at one site or distributed across multiple sites and interconnected by a communication network.

The processes and logic flows described in the specification may be performed by one or more programmable processors executing one or more computer programs or instructions to perform actions by operating on input data and generating output. The processes and logic flows may also be performed by, and apparatus may also be implemented as, special purpose logic circuitry (e.g., FPGA or an ASIC).

Processors suitable for the execution of a computer program include both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data (e.g., magnetic, magneto-optical disks, or optical disks). However, a computer need not have such devices. Moreover, a computer may be embedded in another device (e.g., a mobile telephone, a smart phone, a smart watch, a smart watch, a smart television, a connected device, a personal digital assistant (PDA), a mobile audio or video player, a game console, a set-top box, a Global Positioning System (GPS) receiver, or a portable storage device (e.g., a universal serial bus (USB) flash drive), etc.). Devices suitable for storing computer program instructions and data include all forms of non-volatile memory, media and memory devices semiconductor memory devices (e.g., EPROM, EEPROM, and flash memory devices; magnetic disks, e.g., internal hard disks or removable disks; magneto-optical disks; and optical disks). The processor and the memory may be supplemented by, or incorporated in, special purpose logic circuitry.

To provide for interaction with a user, implementations of the subject described in this specification may be implemented on a computer having a display device (e.g., a LCD (liquid crystal display), OLED (organic light emitting diode), TFT (thin-film transistor), a plasma display, flexible display, or any other monitor for displaying information to the user. The computer may also have an input (such as keyboard, a pointing device, e.g., a mouse, trackball, etc., or a touch screen, touch pad, etc.) by which the user may provide input to the computer. Other kinds of devices may be used to provide for interaction with a user as well. For instance, feedback provided to the user may be any form of sensory feedback (e.g., visual feedback, auditory feedback, or tactile feedback), and input from the user may be received in any form, including acoustic, speech, or tactile input. In addition, a computer may interact with a user by sending documents to and receiving documents from a device that is used by the user; for instance, by sending web pages to a web browser on a user's device in response to request received from the web browser.

Implementations of the subject matter described in this disclosure may be implemented in a computing system that includes a back-end component (e.g., as a data server), a middleware component (e.g., an application server), and/or a front-end component (e.g., a client computer) having a graphical user interface or a web browser through which a user may interact with an implementation of the subject matter described in this disclosure, or any combination of one or more such back-end, middleware, or front-end components. The components of the system may be interconnected by any form or medium of digital data communication (e.g., a communication network). Communication networks include a local area network (LAN) and a wide area network (WAN), an inter-network (e.g., the Internet), and peer-to-peer networks (e.g., ad hoc peer-to-peer networks).

While this specification contains many specific implementation details, these should not be construed as limitations on the scope of any disclosures or of what may be claimed, but rather as descriptions of features specific to particular implementations of disclosures. Certain features that described in this disclosure in the context of separated implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may directed to sub-combination or variation of a sub-combination Similarly, while operations are depicted in the drawing in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in all implementations, and it should be understood that the described program components and systems may generally be integrated together in a single software product or packaged into multiple software products embodies on one or more tangible media.

Thus, particular implementations of the subject matter have been described. Other implementations are within the scope of the following claims. In some cases, the actions recited in the claims can be performed in a different order and still achieve desirable results. In addition, the methods depicted in the accompanying figures do not necessarily require the particular order shown or sequential other, to achieve desirable results. In certain implementations, multitasking and parallel processing may be advantageous.

What is claimed is:

1. A method for the adaptation of a user interface based on the proximity of a plurality of computing devices connected to a network, the method comprising:
associating a first client with a unique identifier,
determining, at a first client, a second client or a server, that multiple second clients are within proximity of the first client;
wherein the first client, the second client or the server determines that the multiple second clients are within proximity by:
receiving, at the second clients, the unique identifier from a first client via a QR code scan event, Bluetooth low energy, NFC, wifi, or RFID;
receiving, at the server, multiple unique identifiers from the multiple second clients;
wherein the server receives the unique identifier of the first client from the multiple second clients and notifies the first client;
wherein the multiple second clients are associated with multiple sets of client data;
comparing, at the server, multiple datasets with the client data associated with and received from the multiple second clients within the first client's proximity,
receiving, by the first client or the server, recommendations data associated with the client data of the multiple second clients being within range of the first client and in response to the comparing; and
adapting, by the first client and in response to receiving the recommendation data, a user interface of the first client based on the recommendation data;
wherein the user interface of the first client is displayed on a second display and the second display is further personalized according to the client data of the multiple second clients.

2. The method of claim 1,
wherein the recommendation data received by the first client is generated using sensory data in conjunction with data from the multiple second clients.

3. The method of claim 1, wherein
the interface of the first client is further adapted based on a change in data on the server, the first client, or the multiple second clients
due to the proximity of the multiple second clients or a third client being within a predefined distance from the first client or
due to a change in sensory data of the first client, the multiple second clients, or the third client.

4. The method of claim 1, further comprising
mirroring, from the first client, onto a second screen of the first client or the second clients, a subset of the interface of the first client; and
upon a change of the interface of the second screen, adapting the interface of a first screen.

5. The method of claim 1,
wherein contents of the server or a client database are modified according to recommendation data.

6. The method of claim 1, further comprising
transmitting, to the server, a request causing the server to send the recommendation data to the second clients.

7. A system for adaptation of a user interface based on the proximity of a plurality of computing devices connected to a network, the system comprising memory storing instructions and processor executing instructions to:
associate a first client with a unique identifier,
determine, at a first client, a second client or a server, that multiple second clients are within proximity of the first client;
wherein the first client, the second client, or the server determines that multiple second clients are within proximity by: receiving, at the second clients, the unique identifier from a first client via a QR code scan event, Bluetooth low energy, NFC, wifi, or RFID;
receiving, at the server, multiple unique identifiers from the multiple second clients;
wherein the server receives the unique identifier of the first client from the multiple second clients and notifies the first client
wherein the multiple second clients are associated with multiple sets of client data;
compare, at the server, multiple datasets with the client data associated with and received from the multiple second clients within the first client's proximity;
receive, by the first client or the server, recommendations data associated with the client data of the second clients being within range of the first client and in response to the compare; and
adapt, by the first client and in response to receiving the recommendation data, a user interface of the first client based on the recommendation data;
wherein the user interface of the first client is displayed on a second display and the second display is further personalized according to the client data of the multiple second clients.

8. The system of claim 7,
wherein the recommendation data received by the first client is generated using the sensory data in conjunction with data from the multiple second clients.

9. The system of claim 7, wherein the user interface of the first client is further adapted based on a change in data on the server, the first client, or the multiple second clients due to the proximity of the multiple second clients or a third client being within a predefined distance from the first client or due to a change in sensory data of the first client, the multiple second clients, or the third client.

10. The system of claim 7, wherein the processor further executes instructions to
mirror, from the first client, onto a second screen of the first client or the second clients, a subset of the interface of the first client; and
upon a change of the interface of the second screen, adapt the interface of the first screen.

11. The system of claim 7,
wherein contents of the server or a client database are modified according to the recommendation data.

12. The system of claim 7, wherein the processor further executes instructions to
transmit, to the server, a request causing the server to send the recommendations data to the second clients.

* * * * *